United States Patent [19]

De Haan

[11] Patent Number: 5,210,618
[45] Date of Patent: May 11, 1993

[54] METHOD, APPARATUS AND RECORD CARRIER FOR VIDEO SIGNAL RECORDING AND READING WHEREIN SIGNAL BLOCKS OCCURRING DURING SWITCHING ARE REPOSITIONED AND PRESERVED

[75] Inventor: Gerard De Haan, Eindhoven, Netherlands

[73] Assignee: U.S. Philips Corporation, Del.

[21] Appl. No.: 741,971

[22] Filed: Aug. 6, 1991

Related U.S. Application Data

[63] Continuation of Ser. No. 530,688, May 30, 1990, abandoned, which is a continuation of Ser. No. 8,704, Jan. 29, 1987, abandoned.

[30] Foreign Application Priority Data

Feb. 3, 1986 [NL] Netherlands .................... 8600254

[51] Int. Cl.$^5$ ................ H04N 9/79; H04N 5/78
[52] U.S. Cl. ........................ 358/314; 360/19.1; 360/38.1
[58] Field of Search ............ 360/10.1, 19.1, 33.1, 360/64, 33.1, 24, 37.1, 18; 358/310, 311, 312, 342, 343, 314

[56] References Cited

U.S. PATENT DOCUMENTS

| | | | |
|---|---|---|---|
| 3,991,265 | 11/1976 | Fukuda et al. | 360/19.1 X |
| 4,227,213 | 10/1980 | Isobe | 358/343 |
| 4,446,488 | 5/1984 | Suzuki | 358/343 X |
| 4,468,710 | 8/1984 | Hashimoto | 360/19.1 X |
| 4,476,501 | 10/1984 | Hirota et al. | 360/19.1 |
| 4,499,503 | 2/1985 | Suzuki | 358/343 X |
| 4,604,655 | 8/1986 | Moriyama | 358/343 |
| 4,680,647 | 7/1987 | Moriyama | 360/19.1 X |
| 4,703,369 | 10/1987 | Moriyama et al. | 360/19.1 X |

OTHER PUBLICATIONS

D2-MAC and Its Consequences, Tetzner et al. Funkschau No. 18 1985 pp. 59-63.

*Primary Examiner*—Andrew L. Sniezek
*Attorney, Agent, or Firm*—Edward W. Goodman

[57] ABSTRACT

When, for example, MAC (multiplexed analog components) signals (inter alia C-MAC or D2-MAC signals) are recorded directly on a video recorder and no special steps are taken, information will be lost as a result of the change-over from recording by one write head to recording by another write head. The relevant signals to be recorded include a sequence of lines with a first signal block containing a line-synchronizing signal and at least one additional signal, and a second signal block containing the chrominance luminance information of the video signal. Specific first signal blocks or at least the additional signals of these first signal blocks are accommodated in a second signal block of a non-relevant video line and are subsequently recorded on the record carrier. After the relevant second signal block has been read from the record carrier, the relevant first signal blocks, or at least the additional signals of these first signal blocks, are extracted from the second signal block and re-inserted into the data stream of first signal blocks at their original locations. The relevant first signal blocks may be those first signal blocks during which the heads are switched or may be other (subsequent, with respect to time) first signal blocks which can no longer be inserted into the data stream of the first signal blocks because these first signal blocks, during which head switching is effected, have been repeated earlier in the data stream.

31 Claims, 5 Drawing Sheets

METHOD, APPARATUS AND RECORD CARRIER FOR VIDEO SIGNAL RECORDING AND READING WHEREIN SIGNAL BLOCKS OCCURRING DURING SWITCHING ARE REPOSITIONED AND PRESERVED

This is a continuation of application Ser. No. 07/530,688, filed on May 30, 1990, which is a continuation of parent application Ser. No. 07/008,704, filed on Jan. 29, 1987 (both now abandoned).

BACKGROUND OF THE INVENTION

1. Field of the Invention

The invention relates to a method of recording and reading a video signal in/from tracks which are inclined relative to the longitudinal direction of a magnetic record carrier in the form of a tape by means of two or more write or read heads mounted on a rotatable head drum, the video signal comprising a sequence of lines with a first signal block containing a line-synchronizing signal and a second signal block containing the chrominance and luminance information of the video signal, the first signal blocks containing at least one additional signal in addition to the line-synchronizing signal. The invention also relates to an apparatus for recording and an apparatus for reading the video signal in/from the magnetic record carrier, for carrying out the method in accordance with the invention. Further the invention relates to a magnetic record carrier obtained by means of the method.

2. Description of the Related Art

The method of the kind defined in the opening paragraph is known from the publication "D2-MAC und die Folgen", Funkschau 18 (1985), pages 59–63. The MAC (multiplexed analog components signals are signals which comprise a sequence of lines each having a first signal block containing the line-synchronizing signal and a second signal block containing the chrominance and luminance information of the video signal. The first signal blocks further contain additional signals, for example audio signals and further data. The first signal blocks in the MAC signals generally comprise digitally encoded signals. The chrominance and luminance information in the second signal blocks generally takes the form of an analog signal. In the MAC signal, one line interval has a length of 64 $\mu s$, the first signal blocks being slightly longer than 10 $\mu s$, the second signal blocks being slightly shorter than 54 $\mu s$. The publication mentions the possibility of recording MAC signals on a video recorder by first converting these signals into standard video signals, for example PAL signals, and subsequently recording the standard video signals on the magnetic record carrier.

However, the advantages of the MAC signals, such as: a higher resolution of the television picture and sound of higher quality and the (virtual) absence of chrominance and luminance crosstalk are then lost.

SUMMARY OF THE INVENTION

It is an object of the invention to provide a method and an apparatus enabling MAC signals to be recorded without losing the inherent advantages of MAC signals. To this end, the invention is characterized in that during recording, at least the additional signal in a specific first signal block is stored in a memory and is subsequently accommodated in one or more second signal blocks associated with one or more non-relevant lines in the video signal, after which said second signal block(s) is (are) recorded in a track on the record carrier, and in that during reading the additional signal is extracted from the relevant second signal block(s) read from the track and is stored in a memory, after which the additional signal is re-inserted into the relevant first signal block. The invention is based on the idea that MAC signals are not first converted into standard video signals but are recorded directly on the record carrier. However, this may give rise to a problem. During switching over from recording with one write head to recording with another write head (referred to as head switching), information may be lost if no special steps are taken. This is because MAC signals do not exhibit instants which recur at regular time intervals and at which no information or, conversely, at which easily predictable information is present, enabling head switching to be effected at these instants.

For a video recorder which is capable of performing a head-switching operation within 54 $\mu s$ and which records at least one complete field (half a picture) between two head-switch instants there is no problem. In such a video recorder, head switching may be performed at the instants at which a second signal block associated with a non-relevant line (for example the first line of each field) of the video signal is recorded.

The solution now proposed is that information which is susceptible to become lost owing to head switching is temporarily stored in a memory and, as a first possibility, is subsequently accommodated in one or more second signal blocks of one or more non-relevant video lines. Another possibility is that the information which may be lost as a result of head switching is temporarily stored in a memory and is subsequently accommodated in one or more other first signal blocks. A consequence of this is that the information in the other first signal blocks should first be accommodated somewhere else, for example in one or more second signal blocks. The information content of these other first signal blocks may, for example, be re-inserted in subsequent first signal blocks. The entire data stream of the first signals blocks is then, in fact, delayed and the last of the first signal blocks associated with one field is then accomodated in one or more second signal blocks associated with one or more non-relevant video lines.

Regardless of how the signals have been recorded, the process should be reversed during playback. After read-out from the tape, the information in the relevant one or more second signal blocks is temporarily stored in a memory and re-inserted into said one or more first signal blocks of the video signal at the original location. A television apparatus which is capable of displaying the MAC signal thus read from the record carrier then enables all the advantages of such MAC signals to be obtained.

The two possibilities briefly indicated above will now be described in more detail hereinafter. First of all, the possibility is described that the information which may become lost as a result of head switching is accommodated in one or more second signal blocks of a non-relevant video line. Such a method is characterized further in that during recording, at least the additional signal in a specific first signal block, during which the changeover from recording with one write head to recording with another write head occurs, is stored in the memory and is subsequently accommodated in the relevant second signal block(s), and in that during reading, at least the first signal blocks read from the tracks are delayed by a time interval T, after which the additional signal is re-inserted into the relevant first signal block.

Video recorders of type I, in which during one field only one change-over from recording with one write head to recording with another write head, is effected, i.e. a complete field (half picture) is recorded between two head switching instants, have a switching time which is several times longer than the 64 μs line period. This change-over may take x (for example 4) times 64 μs and is effected during the vertical flyback. The fact that the video signal in the second signal blocks of these x (=4) lines is lost as a result of said change-over presents no problem, because it falls outside the picture anyway. As already stated in the foregoing, the information in the first signal blocks of these x lines should not be lost. In order to ensure this, the method of recording a video signal on a magnetic record carrier is characterized in that during recording, at least the additional signals of those first signal blocks associated with the successive x lines during which a change-over is effected are stored in a memory and are subsequently accommodated in one or more specific second signal blocks associated with one or more non-relevant lines in the video signal, after which they are recorded in a track on the record carrier. Similarly, the method of reading the video signal thus recorded on the magnetic record carrier is characterized in that during reading, the x additional signals are extracted from the second signal block(s) read from 0 relevant track and are stored in a memory, in that at least the first signal blocks read from the tracks are delayed and the additional signals are re-inserted into the relevant x first signal blocks.

Video recorders of type II perform a head switchover m (for example 4) times per field (half a picture). The switching time is generally very short (approximately 2 μs)). The change-over can be effected during the occurrence of a first signal block, so that the picture content (the information in the second signal blocks) is not affected In order to ensure that the information in the m first signal blocks per field is not lost, the method of recording the video signal on the magnetic record carrier may be characterized in that during recording, at least the additional signals of those m first signal blocks during which changing-over is effected are stored in a memory and are subsequently accommodated in one or more specific second signal blocks associated with one or more non-relevant lines in the video signal, after which they are recorded in a track on the record carrier, and the method of reading a video signal from the magnetic record carrier may be characterized in that during reading, the m additional signals are extracted from the relevant second signal block(s) read from the tape and are stored in a memory, in that at least the first signal blocks read from the tracks are delayed and the m additional signals are re-inserted into the associated m first signal blocks.

The apparatus for carrying out the method of recording a video signal on a magnetic record carrier, comprises:

an input terminal for receiving the video signal, and first switching means having an input, two or more outputs and a control input. The first switching means are constructed to couple the input to one of the outputs under the influence of a first control signal applied to the control input, the input terminal being coupled to the input of the first switching means and each output of said switching means being coupled to an associated write head. The apparatus further comprises a memory and second switching means, in that the memory is adapted to store the additional signal in said first signal block at the instant of switching over from recording with one write head to recording with another write head, under the influence of a control signal applied to a control input of the memory, in that for this purpose an input of the memory is coupled to the input terminal at least at the instand of switching over, in that an output of the memory is coupled to a first one of two inputs of the second switching means, which have an output coupled to the input of the first switching means, and in that the second switching means are adapted to couple one of the two inputs to the output under the influence of a third control signal applied to a control input of said second switching means in such a way that the first input is coupled to the output at the instant at which the second signal block(s) associated with the non-relevant line(s) in the video signal is (are) recorded.

Depending on whether it concerns a type I or II video recorder, this apparatus may be characterized further in that the memory is adapted to store, under the influence of the control signal applied to its control input, the additional signals of those first signal blocks associated with x successive lines during which switching over is effected, or in that the memory is adapted to store, under the influence of the control signal applied to its control input, the additional signals of those m first signal blocks during which switching over is effected.

The apparatus for carrying out the method of reading a video signal from a magnetic record carrier, comprising:

two or more read heads, first switching means having two or more inputs, an output and a control input, which first switching means are constructed to couple one of the inputs to the output under the influence of a first control signal applied to the control input, an output terminal for aupplying the video signal, is characterized in that the apparatus further comprises a memory, a delay means and second switching means, in that the memory is adapted to store under the influence of a second control signal applied to a control input of the memory the additional signal contained in the relevant second signal block(s) read from the track, in that an input of the memory is coupled to the output of the first switching means at least at the instant at which the relevant second signal block(s) is (are) read, in that at least at the instant at which the first signal blocks are read an input of the delay means is coupled to the output of the first switching means, in that outputs of the memory and the delay means are coupled, respectively, to a first input and a second input of the second switching means, and in that the second switching means are adapted to couple one of its two inputs to its output under the influence of a third control signal applied to a control input of said second switching means in such a way that the first input is coupled to the output during the time of switching over, delayed by the time interval T, from reading with one read head to reading with another read head.

Depending on whether the video recorder is of type I or II, this apparatus may be characterized further in that the memory is adapted to store, under the influence of the control signal applied to its control input, the x additional signals contained in the relevant second signal block(s) read from the track and in that the second switching means are adapted in such a way that during the switchover time, delayed by the time interval T, the first input is coupled to the output or in that the memory is adapted to store, under the influence of the control signal applied to its control input, the m additional signals contained in the relevant second signal block(s) read from the track, and in that the second switching means are adapted in such a way that during a field during the m switching-over times, delayed by the time interval T, the first input is coupled to the output.

Hereinafter the other possibility will be described, namely the possibility that information of other first signal blocks than those which may be lost as a result of head switching is accommodated in one or more second signal blocks associated with a non-relevant video line.

For this, the method may be characterized further in that during recording at least the additional signal in a first signal block during which switching over from recording with one write head to recording with another write head is effected is delayed by one or more line periods and is subsequently accommodated in another first signal block and recorded on the record carrier, and in that the original additional first signal of said other first signal block is delayed and subsequently recorded on the record carrier. For use in video recorders of type I, the method of recording the video signal on the magnetic record carrier may be characterized in that during recording, the additional signals of those x first signal blocks associated with successive x lines during which switching over is effected are delayed by at least x line periods and are subsequently accommodated in x other first signal blocks, in that the additional signals of at least x subsequent first signal blocks of the field are stored in the memory and are subsequently accommodated in one or more second signal blocks associated with one or more non-relevant video lines. Similarly, the method of reading the video signal thus recorded from the magnetic record carrier may be characterized in that during reading, the x additional signals are extracted from the relevant second signal block(s) read from the track, are stored in a memory, and are subsequently re-inserted into the relevant x subsequent first signal blocks.

For use in video recorders of type II, the method of recording a video signal in a magnetic record carrier may be characterized in that during recording the additional signals of those first m signal blocks during which switching over is effected are delayed by at least one line period and are subsequently accommodated in m other first signal blocks, in that the additional signals of at least m subsequent first signal blocks of the field are stored in the memory and are subsequently accommodated in one or more second signal blocks associated with one or more nonrelevant video lines, and the method of reading this video signal from the magnetic record carrier may be characterized in that during reading, the m additional signals are extracted from the relevant second signal block(s) read from the track and are stored in a memory, after which the m additional signals are re-inserted into the associated m subsequent first signal blocks.

The apparatus for carrying out the method of recording the video signal in accordance with the second possibility, which apparatus comprises
an input terminal for receiving the video signal.
first switching means having an input, two or more outputs, and a control input, which first switching means are constructed to couple the input to one of the outputs under the influence of a first control signal applied to the control input, the input terminal being coupled to the input of the first switching means and each output of said switching means being coupled to an associated write head, is characterized in that the apparatus further comprises a memory and second switching means, in that the memory is constructed to store the additional signal in said other first signal block under the influence of a second control signal applied to a control input of the memory, in that at least at the instant at which a subsequent first signal block is applied to the input terminal an input of the memory is coupled to said input terminal, in that an output of the memory is coupled to a first one of two inputs of the second switching means, which have an output coupled to the input of the first switching means, and in that the second switching means are adapted to couple one of the inputs of the output under the influence of a third control signal applied to a control input of said second switching means in such a way that the first input is coupled to the output at the instant of recording of one or more second signal blocks associated with one or more non-relevant lines in the video signal.

Depending on whether it is a video recorder of type I or type II, this apparatus may be characterized further in that the memory is adapted to store the additional signals in said x subsequent first signal blocks, in that the input terminal is further coupled to an input of a delay means for delaying at least the x first signal block associated with the successive x lines during which switching over is effected, in that an output of the delay means is coupled to a first input of third switching means, which have a second input coupled to the output of the memory and an output coupled to the first input of the second switching means, and in that the third switching means are adapted to couple one of the inputs to the output under the influence of a control signal applied to a control input of the third switching means, or in that the memory is adapted to store the additional signals of said m subsequent first signal blocks, and in that the input terminal is further coupled to an input of a delay means for delaying at least the m first signal blocks during which switching over is effected, in that the output of the memory is coupled to a first input of third switching means, which have an output coupled to the first output of the second switching means, in that the delay means comprises m tappings, each tapping being coupled to an associated input of fourth switching means, which have an output to a second input of the third switching means, and in that the third and the fourth switching means are adapted to couple one of the inputs to the output under the influence of a control signal applied to a control input of the third switching means and the fourth switching means, respectively.

The apparatus for carrying out the method of reading the video signal in accordance with the second possibility, which apparatus comprises
two or more read heads,
first switching means having two or more inputs, an output and a control input, which first switching means are constructed to couple one of its inputs to its output under the influence of a first control signal applied to its control input,
an output terminal for supplying the video signal, is characterized in that the apparatus further comprises a memory and second switching means, in that the memory is constructed to store, under the influence of a second control signal applied to a control input of the memory, the additional signal accommodated in the relevant second signal block(s) read from the track, in that for this purpose at least at the instant at which the relevant second signal block(s) is (are) read an input of the memory is coupled to the output of the first switching means in that an output of the memory is coupled to a first one of two inputs of the second switching means, whose output is coupled to the output terminal, and in that the second switching means are adapted to couple one of the inputs to the output under the influence of a control signal applied to a control input of said second switching means in such a way that the first input is coupled to the output at the instant at which the additional signal is inserted into the relevant subsequent first signal block.

Depending on whether it is a video recorder of type I or type II, this apparatus may be characterized further in that the memory is adapted to store the x additional signals accommodated in the relevant second signal block(s) read from the track, and in that the second input is coupled to the output of the first switching means, or in that the memory is adapted to store the m additional signals accommodated in the relevant second signal block(s) read from the track, in that the apparatus further comprises a delay means, third switching means and fourth switching means, in that the output of the first switching means is coupled both to the second input of the second switching means and to an input of a delay means, in that the output of the memory is coupled to a first input of the third switching means, whose output is coupled to the first input of the second switching means, and in that the delay means comprises m tappings, each tapping being coupled to an associated input of the fourth switching means, which have an output coupled to the second input of the third switching means, and in that the third switching means and the fourth switching means are adapted to couple one of the inputs to the output under the influence of a control signal applied to a control input of the third switching means, and the fourth switching means respectively.

BRIEF DESCRIPTION OF THE DRAWINGS

Embodiments of the invention will now be described in more detail, by way of example, with reference to the accompanying drawings. It is to be noted that elements bearing the same reference numerals in different Figures are identical. In the drawings.

DESCRIPTION OF THE PREFERRED EMBODIMENT

Figure 1A:
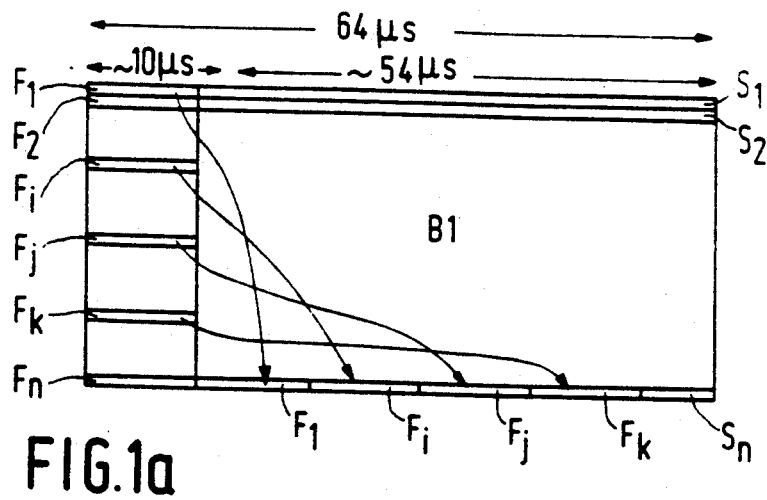
FIG. 1a illustrates the recording method and FIGS. 1b and 1c the read method for use in a type II video recorder.

FIG. 1a schematically illustrates the method of recording the video signal on a magnetic record carrier, specifically the signal processing necessary before the information can be recorded on the record carrier by means of a type II video recorder. FIG. 1a shows schematically the MAC signal comprising n lines, each line containing a first signal block F and a second signal block S. The first signal block F of a line contains a line synchronizing signal (the horizontal synchronization) and an additional signal. This additional signal is, for example, a digital audio signal together with any further data. The second signal block S contains the chrominance and luminance information of the video signal.

FIG. 1a shows schematically the MAC signal of one field, (half a picture B1). During one field the video recorder switches over m (=4) times from recording by means of one write head to recording by means of another write head. These switching operations may be performed in the first signal blocks $F_1$, $F_i$, $F_j$ and $F_k$. In order to ensure that the information in these first signal blocks is not lost during recording, these first signal blocks are accommodated in a second signal block S associated with a nonrelevant line. In FIG. 1a this is the last second signal block $S_n$. The video information in this block $S_n$ is irrelevant because the line n falls outside the television picture. Instead of video information, the information from blocks $F_1$, $F_i$, $F_j$ and $F_k$ is therefore accommodated in block $S_n$ and subsequently the signal thus obtained is recorded on the record carrier.

In principle, it is also possible to accommodate the above information from blocks $F_1$, $F_i$, $F_j$, $F_k$ in one or more second signal blocks of the first (approximately) twenty-three lines of a field, which lines appear in the vertical flyback interval and therefore do not contain any (relevant) video information.

Figures 1B, 1C:
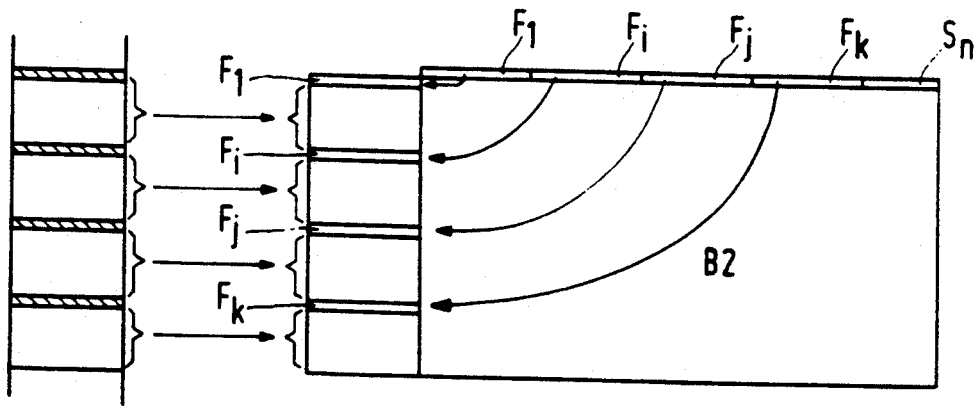

FIG. 1b illustrates schematically the method of reading the video signal from the record carrier, specifically the signal processing necessary to reconvert the information read from the record carrier into an MAC signal. The information in field B1 shown in FIG. 1a is read from the record carrier. Since during reading, switching over from one read head to another read head is effected in the first signal blocks $F_1$, $F_i$, $F_j$ and $F_k$, these signal blocks do not contain any relevant information (see hatched blocks in FIG. 1c, which represents the first signal blocks read from the record carrier). Now all the first signal blocks are delayed by a time interval T equal to the field period (which is n time 64 $\mu$s). The first signal blocks contained in the second signal block $S_n$ read are extracted therefrom and stored in a memory, after which they are re-inserted at their original locations (namely the first signal blocks $F_1$, $F_i$, $F_j$ and $F_k$) in the data stream of first signal blocks which has been delayed by the time interval T and reconstructed is then recombined with the data stream of the second signal blocks (which also may have been delayed by a specific time interval). FIG. 1b illustrates the situation in which the data stream of first signal blocks has been combined with the non-delayed data stream of second signal blocks (i.e. with the video information of the next field B2). Since a field comprises 312 lines the difference in time between the two data streams is approximately 20 ms. Such a difference in time between the two data streams is permissible.

The data stream of first signal blocks may have a delay larger than the field period (20 ms) provided that the resulting difference in time between the two data streams is permissible.

Figure 2A:
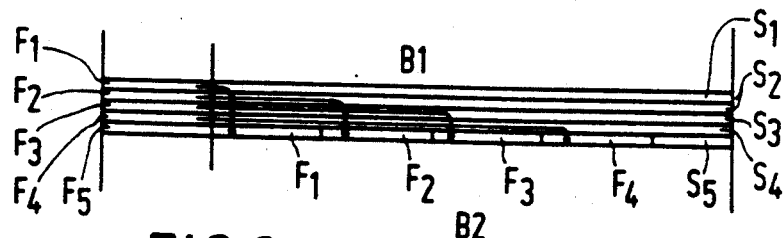
FIG. 2a illustrates the recording method and FIGS. 2b and 2c the read method for use in a type I video recorder.

FIG. 2a illustrates schematically the method of recording the video signal on a magnetic record carrier and specifically the signal processing necessary before it is possible to record the information on the record carrier by means of a type I video recorder. Such a video recorder records exactly one field between two head switching operations. Head switching is performed during the vertical flyback. FIG. 2a represents the video information of the lower part of a field B1 and the upper part of a succeeding field B2. Head switching is effected during (x=) four lines containing the first and the second signal blocks $F_1$ and $S_1$, $F_2$ and $S_2$, $F_3$ and $S_3$, $F_4$ and $S_4$. The information of these four lines would be lost as a result of head switching. For the video information in the second signal blocks $S_1$ to $S_4$ this is not a problem. However, the information in the first signal blocks $F_1$ to $F_4$ should be preserved. The content of these first signal blocks is therefore accommodated in the second signal block ($S_5$) of a non-relevant video line (i.e. line 5). The video information in the second signal block $S_5$ is not relevant because this line 5 falls outside the television picture. Instead of this video information, the information of blocks $F_1$ to $F_4$ is accommodated in block $S_5$. Subsequently, the signal thus obtained is recorded on the record carrier.

Figures 2B, 2C:
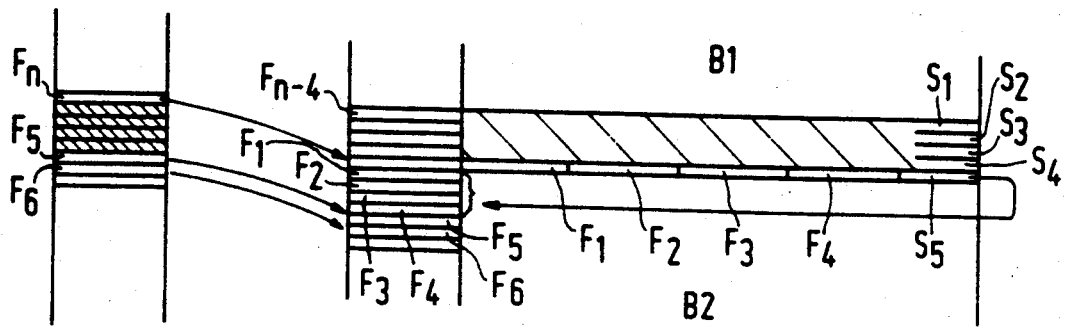

FIG. 2b illustrates schematically the signal processing necessary for reconverting the information read from a record carrier by means of a type I video recorder into a useful MAC signal. The data stream of first signal blocks read from the record carrier (see FIG. 2c, where the hatched blocks are the blocks which do not contain any (relevant) information as a result of head switching during reading) is now delayed by a time interval T equal to (x+1=) 5 times $t_1$, $t_1$ being the line period of 64 μs. The first signal blocks contained in the signal block $S_5$ being read are extracted therefrom, are stored in a memory and are subsequently re-inserted into the data stream of first signal blocks (namely the first signal blocks $F_1$ to $F_4$) at the original locations, which data stream has been delayed by the time interval T. The data stream of first signal blocks which has been delayed by the time interval T and reconstructed is now recombined with the data stream of second signal blocks (which also may have been delayed by a specific time interval). FIG. 2b represents the situation in which the data stream of first signal blocks has been combined with the non-delayed data stream of second signal blocks, so that there is a difference in time of 320 μs between the two data streams, which is permissible.

The delay of the data stream of first signal blocks may also be larger than 320 μs provided that the resulting difference in time between the two data streams remains permissible. Further, it is evident from FIG. 2b that the second signal blocks $S_1$ to $S_4$ do not contain any information because at this instant head switching is effected during writing and reading. Moreover, the second signal block $S_5$ does not contain any chrominance and luminance information because the content of the first signal blocks $F_1$ to $F_4$ is accommodated in this block.

Figure 3:
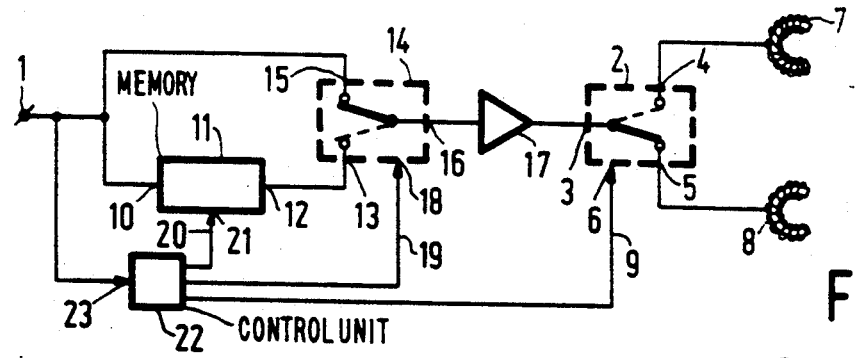
FIG. 3 shows a first apparatus for recording the video signal.

FIG. 3 shows an apparatus for recording a video signal on a magnetic record carrier. The apparatus comprises an input terminal 1 for receiving a video signal, for example a D2-MAC signal or a C-MAC signal, first switching means 2 having an input 3, two (or more) outputs 4 and 5 and a control input 6, and two (or more) write heads 7 and 8. The outputs 4 and 5 are respectively, coupled to a write head 7 and 8 respectively mounted on a rotatable head drum (not shown). The first switching means 2 are constructed to couple the input 3 to one of the outputs 4 or 5 under the influence of a control signal 9 applied to the control input 6. The input terminal 1 is coupled to an input 10 of a memory 11, which has an output 12 coupled to a first input 13 of second switching means 14. The input terminal 1 is also coupled to a second input 15 of the second switching means 14, which have an output 16 coupled to the input 3 of the first switching means 2 via a recording amplifier 17. The second switching means 14 are constructed to couple one of the two inputs 13 and 15 to the output 16 under the influence of a control signal 19 applied to a control input 18. The memory 11 is constructed to store the additional signal in the first signal block which appears simultaneously with a head-switching operation. This storage in the memory 11 is effected under the influence of a control signal 20 applied to a control input 21 of the memory 11. The control signals 9, 19 and 20 are supplied by a control unit 22 which derives these control signals from the video signal applied to an input 23.

The operation of the apparatus shown in FIG. 3 for carrying out the method as described with reference to FIG. 1a will now be described in more detail.

Since the video recorder is of the type II, the times for switching from one write head to another write head are short and fall within the first signal blocks $F_1$, $F_i$, $F_j$, $F_k$. At the instant at which the first signal block $F_1$ is applied to the input terminal 1 the control unit 22 supplies a control signal 9 to the first switching means 2, so that the first switching means 2 are set to the position indicated in uninterrupted lines, i.e. the input 3 and the output 5 are interconnected. In addition, the control unit 22 supplies a control signal 20 to the memory 11, so that the content of the first signal block $F_1$ is loaded into this memory 11. The memory 11 is, for example, a shift register into which the content of the signal block $F_1$ is shifted under the influence of the control signal 20. Subsequently, the second signal block $S_1$ is applied to the input terminal 1. Since the second switching means 14 are in the position indicated in uninterrupted lines, this signal block is applied to the write head 8 via the second switching means 14, the recording amplifier 17 and the first switching means 2 and is recorded in a track on the magnetic record carrier (not shown). Similarly, all the succeeding first and second signal blocks, namely $F_2$ and $S_2$ to $F_{i-1}$ and $S_{i-1}$ are recorded in the same track.

Subsequently, the first signal block $F_i$ is applied to the input terminal 1. Again the control unit 22 supplies a control signal 9 to the first switching means 2, causing these switching means to be set to the position indicated in broken lines, and said control unit also supplies a control signal 20 to the memory 11, so that the first signal block $F_i$ is stored in the memory 11. After this, the signal blocks $S_i$, $F_{i+1}$, $S_{i+1}$, ..., $F_{j-1}$, $S_{j-1}$ are successively applied to the input terminal 1 and to the write head 7 via the second switching means 14, the recording amplifier 17 and the first switching means 2. These blocks are then recorded on the record carrier in a second track which adjoins the first track.

This process is repeated for the first signal block $F_j$, which is again stored in the memory 11, and the signal blocks $S_j$, $F_{j+1}$, $S_{j+1}$, ..., $F_{k-1}$, $S_{k-1}$, which are recorded in a succeeding track on the record carrier by means of the write head 8.

Subsequently, the first signal block $F_k$ is applied to the input terminal 1. Again the control unit 22 supplies a control signal 9 and a control signal 20. As a result of this, the block $F_k$ is read into the memory 11. Subsequently, the blocks $S_k$, $F_{k+1}$, $S_{k+1}$, ..., $F_{n-1}$, $S_{n-1}$ and $F_n$ are recorded in the next track by means of the write head 7. After the first signal block $F_n$ has been recorded, the control unit 22 supplies a control signal 19 and a control signal 20. Under the influence of the control signal 19, the second switching means 14 are set to the position shown in broken lines and the memory 11 is read out, so that instead of the second signal block $S_n$, the contents of the memory 11, i.e. the first signal blocks $F_1$, $F_i$, $F_j$ and $F_k$, are recorded in the track by means of the write head 7. It is obvious that the memory 11 should have a storage capacity which is large enough to store the first signal blocks $F_1$, $F_i$, $F_j$, $F_k$.

Now one field is recorded on the record carrier in four adjacent tracks. This process is repeated for the following fields.

The operation of the apparatus shown in FIG. 3 for carrying out the method illustrated in FIG. 2a, will now be described. Since the video recorder is of the type I with only one head-switching operation per field, the times for switching from one write head to the other write head are long. Each switching time falls within the time interval occupied by the signal blocks $F_1$ and $S_1$ to $F_4$ and $S_4$. During recording of the field B1, the first and second switching means 2 and 14 are in the positions indicated in uninterrupted lines. This means that the signal blocks $F_6$, $S_6$, $F_7$, $S_7$, ..., $F_n$, $S_n$ of the field B1 are recorded in a track on the record carrier by the write head 8. At the instant at which the first signal block $F_1$ of the field B2 is applied to the input terminal 1, the control unit 22 supplies a control signal 9 to the first switching means 2, so that these switching means are set to the other position. The control unit 22 now supplies a control signal 20 to the memory 11 four times in succession, namely at the instants at which the first signal blocks $F_1$, $F_2$, $F_3$ and $F_4$ are applied to the input terminal 1. Consequently, these four signal blocks are stored in the memory 11. At the instant at which the first signal block $F_5$ is applied to the input terminal 1, switching over is completed, so that the first signal block $F_5$ can be recorded on the record carrier by means of the write head 7. At this instant, the control unit 22 supplies a control signal 19 to the second switching means 14, so that the second switching means 14 are set to the position indicated in broken lines, and the control unit 22 supplies a control signal 20 to the memory 11, causing this memory 11 to be read out, the content of the first signal blocks $F_1$ to $F_4$ to be inserted into said second signal block $S_5$ and, instead of the original information in this second signal block, the content of the first signal blocks $F_1$ to $F_4$ to be recorded in the track by the write head 7. After this, the second switching means 14 are reset to the original position and the signal blocks $F_6$, $S_6$, ..., $F_n$, $S_n$ of the field B2 can be recorded in the relevant track on the record carrier. This process is repeated for succeeding fields.

Figure 4:
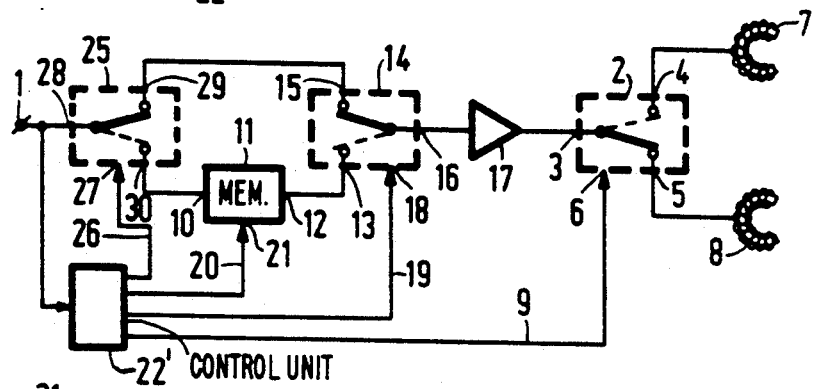
FIG. 4 shows a second apparatus for recording the video signal.

FIG. 4 shows another apparatus for recording a video signal, which apparatus bears much resemblance to the apparatus shown in FIG. 3. The difference is that third switching means 25 are coupled between the input terminal 1 and the inputs 10 and 15 of the memory 10 and the second switching means 14, respectively, and the control unit 22' is adapted to supply a control signal 26 to a control input 27 of the third switching means 25. The input terminal 1 is coupled to an input 28 of the third switching means 25. The outputs 29 and 30 are coupled to the input 15 of the second switching means 14 and the input 10 of the memory 11, respectively.

The apparatus shown in FIG. 4 operates in the same way as the apparatus shown in FIG. 3. However, in addition, the control unit 22' supplies a control signal 26 to the third switching means 25 at the instant of switching over from one write head to the other, so that the third switching means 25 are then set to the position indicated in broken lines. This means that the blocks $F_1$, $F_i$, $F_j$, $F_k$ (see FIG. 1a) or the blocks $F_1$ to $F_4$ (see FIG. 2a) can then be loaded into the memory 11.

Figure 5:
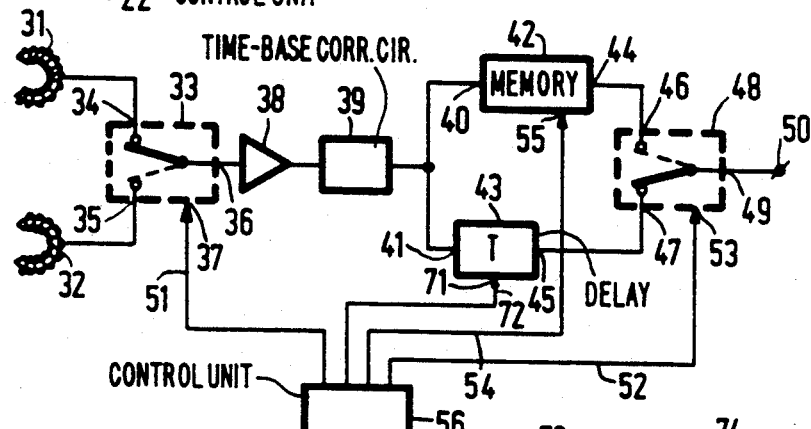
FIG. 5 shows a first apparatus for recording the video signal.

FIG. 5 shows an apparatus for reproducing a video signal from a magnetic record carrier. The apparatus comprises two (or more) read heads 31 and 32, first switching means 33 having two (or more) inputs 34 and 35, an output 36 and a control input 37. By means of a playback amplifier 38 and a time-base correction circuit 39, the output 36 is coupled to inputs 40 and 41 of a memory 42 and a delay means 43, respectively. The outputs 44 and 45 of the memory 42 and the delay means 43, respectively, are coupled to, respectively, a first input 46 and a second input 47 of second switching means 48, which have an output 49 coupled to an output terminal 50 on which the video signal appears. The delay means 43 is controlled by a control signal 72 applied to a control input 71.

The first switching means 33 are constructed to couple one of the inputs 34, 35 to the output 36 under the influence of a control signal 51 applied to the control input 37. The second switching means 48 are constructed to couple one of the inputs 46, 47 to the output 49 under the influence of a control signal 52 applied to a control input 53 of the second switching means 48. The memory 42 is constructed to store, under the influence of a control signal 54 applied to a control input 55 of the memory 42, the additional signal contained in the relevant signal block read from the track. The control signals 51, 52, 54 and 72 are supplied by a control unit 56 which is capable of deriving these control signals from an internal clock in the control unit 56, which clock can be synchronized in a suitable manner with the signal read from the tape.

The operation of the apparatus shown in FIG. 5, for carrying out the method of reading the video signal from the magnetic record carrier, will be described in more detail hereinafter.

Figure 6:
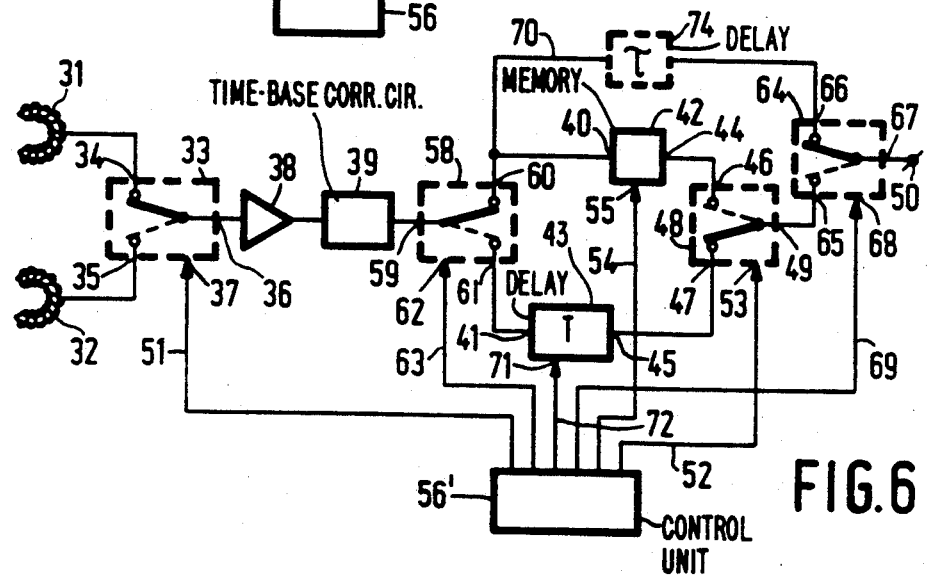
FIG. 6 shows a second apparatus for reading the video signal.

FIG. 6 shows another apparatus for reading a video signal from a magnetic record carrier The apparatus of FIG. 6 has much in common with the apparatus shown in FIG. 5. In addition the apparatus shown in FIG. 6 comprises third switching means 58, having an input 59 coupled to the output of the time-base correction circuit 39, a first output 60 and a second output 61 coupled to the input 40 of the memory 42 and the input 41 of the delay means 43, respectively, and a control input 62 for receiving a control signal 63. Further, the apparatus comprises fourth switching means 64 having a first input 65 coupled to the output 49 of the second switching means 48, a second input 66 coupled to the output 60 of the third switching means 58, an output 67 coupled to the output terminal 50, and a control input 68 for receiving a control signal 69. The control signals 51, 52, 54, 63, 69 and 72 are supplied by control unit 56', which is capable of deriving these control signals from an internal clock in the control unit 56, which clock can be synchronized in a suitable manner with the signal read from the tape.

The operation of the apparatus of FIG. 6, for carrying out the method as described with reference to FIG. 1b, will now be explained. For the time being the circuit 70 is to be regarded as an electrical interconnection. It is assumed that the read head 31 reads the first signal block $F_2$ of the field B1 (see FIG. 1a) from a track. The control signal 63 is then such that the third switching means 58 are set to the (lower) position indicated in broken lines. The signal block $F_2$ is then applied to the input 41 of the delay means 43, for example a (digital) shift register, via the first and third switching means 33 and 58 and read into said delay means 43 under the influence of the control signal 72. After the signal block $F_2$, the third switching means 58 are changed over and the second block $S_2$ is applied to the output terminal via the first and third switching means 33 and 58, the circuit 70 and the fourth switching means 64. Subsequently, the third switching means 58 change over and the signal block $F_3$ is shifted into the delay means 43. The third switching means 58 then change over again and the signal block $S_3$ is supplied to the output terminal 50 via the circuit 70. This continues until the signal blocks $F_{i-1}$ and $S_{i-1}$ have been read. The first switching means 33 are then changed over under the influence of the control signal 51. The third switching means 58 are now again in the (lower) position indicated in broken lines. At this instant, and subsequent switching instants no information, i.e. no useful information, is read into the memory 42, see the hatched blocks in FIG. 1c. Subsequently, the third switching means 58 are set to the upper position and the second signal block $S_i$ read from the next track by the read head 32 is applied to the output terminal 50 via the circuit 70. This proceeds until, after two further switching operations of the first switching means 33, the signal blocks $F_{n-1}$ and $S_{n-1}$ have been read. Subsequently, the third switching means 58 are set to the lower position and the block $F_n$ is read into the delay means 43 under the influence of the control signal 72. After this, the third switching means 58 change over to the upper position. The block $S_n$, containing the (additional information from) blocks $F_1$, $F_i$, $F_j$ and $F_k$, is read and is loaded into the memory 42 under the influence of the control signal 54. At this instant the memory 42 contains the signal blocks $F_1$, $F_i$, $F_j$ and $F_k$ and the delay means 43 contains the blocks $F_2$ to $F_{i-1}$, $F_{i+1}$ to $F_{j-1}$, $F_{j+1}$ to $F_{k-1}$, $F_{k+1}$ to $F_n$ (see FIG. 2c).

While the first and second signal blocks associated with the next field B2 are being read from the record carrier, the first signal blocks $F_1$ to $F_n$ stored in the memory 42 and in the delay means 43 are inserted into the first signal blocks of the field B2. This proceeds as follows.

After the block $S_n$ of the field B1 has been read a change-over to the other read head (the read head 31) is effected. Moreover, the second switching means 48 are set to the upper position and the fourth switching means 64 to the lower position and the first signal block F of the field B1 is read out to the memory 42 under the influence of the control signal 54 and applied to the output terminal 50. After this, the fourth switching means 64 are set to the upper position, so that subsequently, the second signal block $S_1$ of the field B2 read by the read head 31 is applied to the output terminal 50. Next the second and fourth switching means 48 and 64 are both set to their lower positions and under the influence of the control signal 72, the signal block $F_2$ of the field B1 is read out of the delay means 43 and applied to the output terminal 50. Simultaneously, the signal block $F_2$ of the field B2 is shifted into the delay means 43, as already explained hereinbefore for the field B1 read from the record carrier. Subsequently, the fourth switching means 64 are set to the upper position and the second signal block $S_2$ of the field B2 is applied to the output terminal. This change-over of the fourth switching means 64 continues until the signal blocks $F_2$ to $F_{i-1}$ of the field B1 are shifted out of the delay means 43 and combined with the signal blocks $S_2$ to $S_{i-1}$ of the field B2. Subsequently, the second switching means 48 are set to the upper position and the fourth switching means 64 to the lower position and, under the influence of the control signal 54, the block $F_i$ of the field B1 is read out of the memory 42 and applied to the output terminal 50. The fourth switching means 64 again switch to the upper position, so that the block $S_i$ of the field B2 is supplied to the output terminal 50. After this, with the second switching means 48 in the lower position and the fourth switching means 64 alternately in the lower and the upper position, the blocks $F_{i+1}$ to $F_{j-1}$ of the field B1 are combined with the blocks $S_{i+1}$ to $S_{j-1}$ of the field B2.

This process continues until all first signal blocks of the field B1 have been combined with the second signal blocks of the field B2. In the meantime, the first signal blocks of the field B2 have been loaded into the memory 42 and the delay means 43 and are subsequently combined with the second signal blocks of the next field (B3, not shown).

The delay means 43 provide a delay T equal to one field period. The circuit 70 may include a delay means 74. This delay means 74 may provide (analog) delay $\tau$ of, for example, one field period. In this case the first and the second signal blocks of the same field are always combined with one another. However, other delay times $\tau$ are also possible, provided that the data stream to be combined do not coincide in time. The apparatus shown in FIG. 6 is very suitable for reading MAC signals in which the first signal blocks contain digital information which can easily be delayed in a (digital) delay means 43, and in which the second signal blocks contain analog information which is applied directly (i.e. not via the delay means 74) to the output terminal 50 via the circuit 70.

The operation of the apparatus shown in FIG. 6 will now be described for a read method as described with reference to FIGS. 2b and 2c.

The field B1 is read by means of a read head 31, the third switching means 58 being in the lower position when the first signal block F is being read and the relevant first signal block F is being read into the delay means 43 under the influence of the control signal 72, the third switching means 58 being in the upper position when the second signal block S is being read and the relevant second signal block being applied to the output terminal 50 (because the third switching means 64 are in the upper position). During switching from the read head 31 to the read head 32 no reading is effected for four line periods. After this, the first signal block $F_5$ of the field B2 is read and stored in the delay means 43. Subsequently, the third switching means 58 are reset to the upper position and the content of the second signal block $S_5$ of the field B2 is loaded into the memory 42 under the influence of the control signal 54. Simultaneously, the block $F_n$ of the field B1 is supplied from the delay means 43 to the output terminal 50. The second signal block $S_5$ contains the information from the first signal blocks $F_1$ to $F_4$ of the field B2. Consequently, this information is now present in the memory 42.

At the instant at which the signal block $F_6$ of the field B2 is read into the delay means 43 (third switching means 58 in the lower position), the signal block F is read out of the memory 42 under the influence of the control signal 54 and applied to the output terminal 50 via the second switching means 48 (the upper position) and the fourth switching means 64 (in the lower position). Subsequently, the block $S_6$ is read and applied to the output terminal 50 via the third and fourth switching means 58 and 64 (both in the upper position). After this, at the instant at which the signal block $F_7$ is loaded into the delay means 43 (third switching means 58 in the lower position), the signal block $F_2$ is read out of the memory 42 under the influence of the control signal 54 and applied to the output terminal 50 via the second switching means 48 (in the upper position) and the fourth switching means 64 (in the lower position). Similarly, $S_7$, $F_3$, $S_8$, $F_4$ and $S_9$ are successively applied to the output terminal.

Subsequently, at the instant at which the block $F_{10}$ is loaded into the delay means 43 (the switching means 58 in the lower position), the block $F_5$ is read out of the delay means 43 and applied to the output terminal 50 via the second and fourth switching means 48 and 64 (both in the lower position), after which $S_{10}$ appears on the output terminal 50 (the fourth switching means 64 being in the upper position).

Subsequently, the first signal blocks $F_6$, $F_7$, . . . etc., delayed by five line periods in the delay means 43, are inserted between the second signal blocks $S_{11}$, $S_{12}$, . . . etc. by the repeated change-over of the fourth switching means 64, the second switching means 48 being in the lower position, see also FIGS. 2b and 2c.

In the present case, the circuit 70 may again include (analog) delay means 74, which provides a delay of, for example, five line periods. The first and the second signal blocks associated with the same line are then combined with each other but other delay times $\tau$ are also possible, provided that the data stream to be combined do not coincide in time.

As already stated in the foregoing, the apparatus shown in FIG. 6 is very suitable for reading MAC signals in which the first signal blocks contain a digital signal and the second signal blocks an analog signal (or vice versa)

If the first and the second signal blocks both contain digital (or analog) signals the apparatus shown in FIG. 5 is very suitable.

The apparatus shown in FIG. 5 operates as follows. The field B1 of FIG. 1a is read. This means the blocks $F_1$, $S_1$, $F_2$, $S_2$, . . . , $F_{n-1}$, $S_{n-1}$ are read and are successively loaded into the delay means 43 under the influence of the control signal 72. The blocks $F_1$, $F_i$, $F_j$ and $F_k$ do not contain any (useful) information because head switching is effected at the instants at which these blocks are read. After this, the second signal block $S_n$ is read and under the influence of the control signal 54 and it is stored in the memory 42. Since the delay means 43 provides a delay T equal to the field period, the field B1 is read out of the delay means 43 and the memory 42 under the influence of control signals 72 and 54 at the same time that the field B2 is read from the record carrier and loaded into the delay means 43 and the memory 42. The second switching means 48 are in the upper position and, under the influence of the control signal 54, the first signal block $F_1$ of the field B1 is read out of the memory 42 and applied to the output terminal 50. Subsequently, the second switching means 48 are set to the lower position. Under the influence of the control signal 72, the signal blocks $S_1$, $F_2$, $S_2$, . . . $F_{i-1}$, $F_{j-1}$ are shifted out of the delay means 43 and applied to the terminal 50. The second switching means 48 are reset to the upper position, causing the first signal block $F_i$ to be read out of the memory 42, after which the second switching means 48 again switch over and the signal blocks $S_i$, $F_{i+1}$, $S_{i+1}$, . . . , $F_{j-1}$, $S_{j-1}$ are shifted out of the delay means 43. This is repeated twice, after which the entire field B1 has been reproduced.

This method is similar to that of FIGS. 1b and c, with the difference that in addition, the data stream of second signal blocks is delayed by one field period.

Alternatively, the apparatus shown in FIG. 5 can function as follows. The field B2 of FIG. 2a is read. This means that at a given instant, the first block of useful information (which is the block $F_5$) is shifted into the delay means 43 under the influence of the control signal 72. Subsequently, the signal block $F_5$ containing the information of the first signal blocks $F_1$ to $F_4$ is loaded into the memory 42 under the influence of the control signal 54. At the instant at which the block $F_6$ is shifted into the delay means 43, the second switching means 48 are in the upper position and, under the influence of the control signal 54, the signal block $F_1$ is read out of the memory 42 and applied to the terminal 50. Subsequently, the second switching means 48 are changed over and the block $S_1$ (which does not contain any useful information) is shifted out of the delay means 43 and applied to the terminal 50. At the same time the block $S_6$ is read from the track and shifted into the delay means 43. Subsequently, the second switching means 48 are set to the upper position and the signal block $F_2$ is read out of the memory 42. With the aid of the second switching means 48, which are continually changed over in this way, the block $S_2$ is read out of delay means 43, $F_3$ is read out of memory 42, $S_3$ is read out of 43, and $F_4$ is read out of memory 42 after which they are applied to the terminal 50. After this, the second switching means 48 are set to the lower position and the blocks $S_4$, $F_5$, $S_5$, . . . $F_n$ and $S_n$ are read out of the delay means 43 and applied to the terminal 50.

In fact, this is a description of the method of FIGS. 2b and 2c, with the difference that in addition, the data stream of second signal blocks is delayed by five line periods.

Figure 7A:
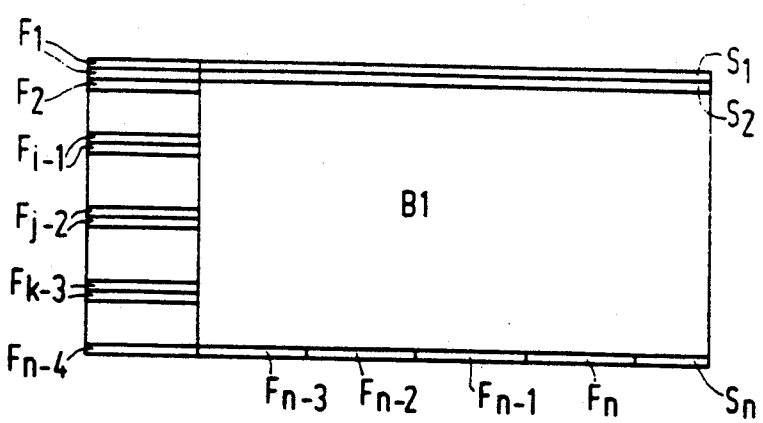
FIG. 7a illustrates another recording method and FIGS. 7b and 7c the corresponding read method for use in a type II video recorder.

FIG. 7a shows schematically another method of recording a video signal, for example an MAC signal, on a magnetic record carrier. specifically the signal processing necessary before the information can be recorded on the record carrier by means of a type II video recorder. Prior to recording on the record carrier, the first signal blocks during which head switching is effected are repeated. The first head switching operation is effected in the field B1 during the first signal block $F_1$. Therefore, the signal block $F_1$ is repeated. This means that the first signal block $F_1$ is now situated at the location where in FIG. 1a the first signal block $F_2$ is situated. This second first signal block now precedes the second signal block $S_2$. The first signal blocks $F_2$ to $F_{i-1}$ now appear in the video signal with a delay of one line period, which means that the next head-switching operation is effected during the first signal block $F_{i-1}$. This first signal block is also repeated. Consequently, the first signal blocks $F_i$ to $F_{j-2}$ appear in the video signal with a delay of two line periods which again means that the following head switching operation is effected during the first signal block $F_{j-2}$. This first signal block is also repeated. Consequently, the first signal blocks $F_{j-1}$ to $F_{k-3}$ appear in the video signal with a delay of three line periods, which means that the last head switching operation is effected during the field B1 in the first signal block $F_{k-3}$. This first signal block is repeated, so that subsequently, the first signal blocks $F_{k-2}$ to $F_{n-4}$ appear in the video signal with a delay of four line periods. The first signal block $F_{n-4}$ then precedes the second signal block $S_n$, so that in the data stream of first signal blocks there is no more room for the last four first signal blocks $F_{n-3}$ to $F_n$. These four first signal blocks are therefore accommodated in the second signal block $S_n$ of the (non relevant) video line n instead of the video information of the second signal block $S_n$ and subsequently recorded on the record carrier.

Figures 7B, 7C:
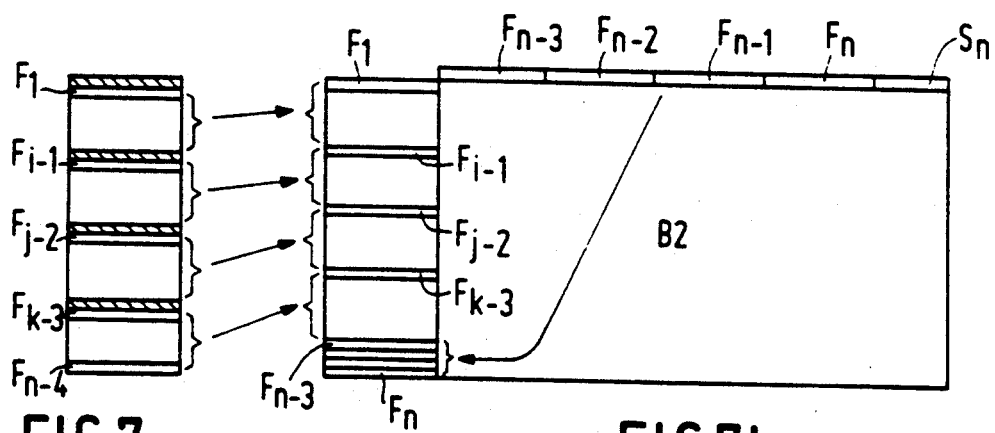

FIG. 7b illustrates the method of reading the video signal and in particular, the signal processing necessary for reconverting the information read from the record carrier into an MAC signal. The information covering the field B1 and shown in FIG. 7a is read from the record carrier. The data stream of first signal blocks being read is shown separately in FIG. 7c. The hatched areas indicate the positions where no (relevant) information is situated as a result of head switching during recording and reproduction. The data stream of first signal blocks $F_1$ to $F_{i-2}$ is delayed by one field period minus one line period (the duration of a half picture minus one line period) and the content of the second signal block $S_n$ being read is extracted from the second signal block and stored in the memory. The first signal blocks $F_1$ to $F_{i-2}$ of the field B1 are subsequently combined with the second signal blocks $S_1$ to $S_{i-2}$ of the field B2. The data stream of first signal blocks $F_{i-1}$ to $F_{j-3}$ of the field B1 read from the track is delayed by one field period minus two line periods and is subsequently combined with the second signal blocks $S_{i-1}$ to $S_{j-3}$ of the field B2 being read from the record carrier at this instant.

The data stream of first signal blocks $F_{j-2}$ to $F_{k-4}$ of the field B1 is delayed by one field period minus three line periods and subsequently combined with the second signal blocks $S_{j-2}$ to $S_{k-4}$ of the field B2 being read at this instant. Similarly, the first signal blocks $F_{k-3}$ to $F_{n-4}$ of the field B1 are delayed by one field period minus four line periods and subsequently combined with the second signal blocks $S_{k-3}$ to $S_{n-4}$ of the field B2. Subsequently, the first signal blocks $F_{n-3}$ to $F_n$ of the field B1 are read out of the memory and combined with the second signal blocks $S_{n-3}$ to $S_n$ of the field B2.

All the remarks made with reference to FIG. 1b as regards the difference in time between the two data streams and the delay (if any) of the data stream of the second signal blocks now also apply.

Figure 8A:
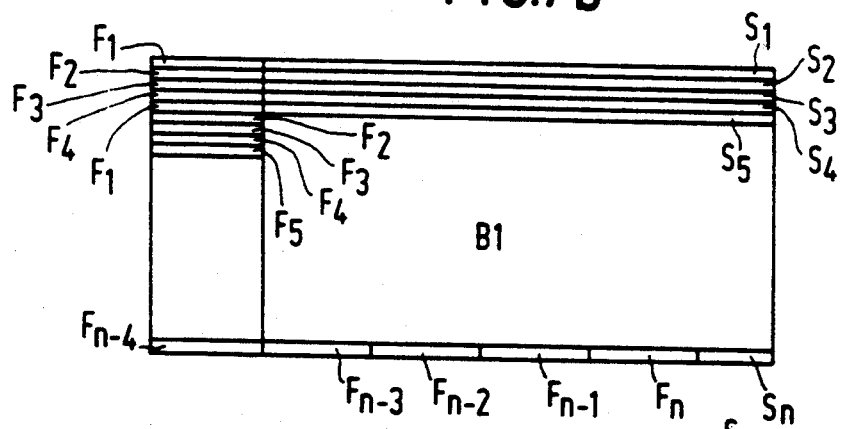
FIG. 8a illustrates this other recording method and FIG. 8b the corresponding read method for use in a type I video recorder.

FIG. 8a illustrates schematically the method of recording an MAC signal on a magnetic record carrier and, in particular, the signal processing necessary for recording information on the record carrier by means of a type I video recorder. As will be apparent from FIG. 8a, the data stream of first signal blocks $F_1$ to $F_{n-4}$ of the field B1 is delayed by four line periods and, combined with the second signal blocks $S_5$ to $S_n$, recorded in a track on the record carrier. It will also be appreciated that in the data stream of first signal blocks there is no more room for accommodating the first signal blocks $F_{n-3}$ to $F_n$. These four first signal blocks are therefore accommodated in the second signal block $S_n$ and subsequently recorded in the track on the record carrier.

Figure 8B:
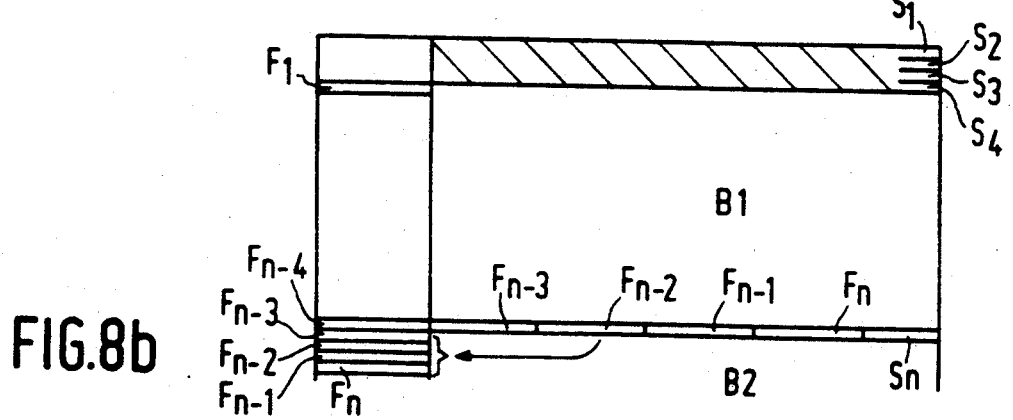

FIG. 8b schematically illustrates the signal processing necessary for re-converting information read from a record carrier by means of a type I video recorder into a useful MAC signal. The blocks $F_1, S_5, F_2, S_6, \ldots, F_{n-5} F_{n-1}, F_{n-4}$ and $S_n$ are successively read from the track. The first signal blocks $F_{n-3}$ to $F_n$ in the second signal block $S_n$ are extracted therefrom, stored in the memory and subsequently re-inserted into the data stream of first signal blocks.

Again all the remarks made with reference to FIG. 2b as regards the difference in time between the two data streams and the delay (if any) of the data stream of second signal blocks also apply to this case.

Figure 9:
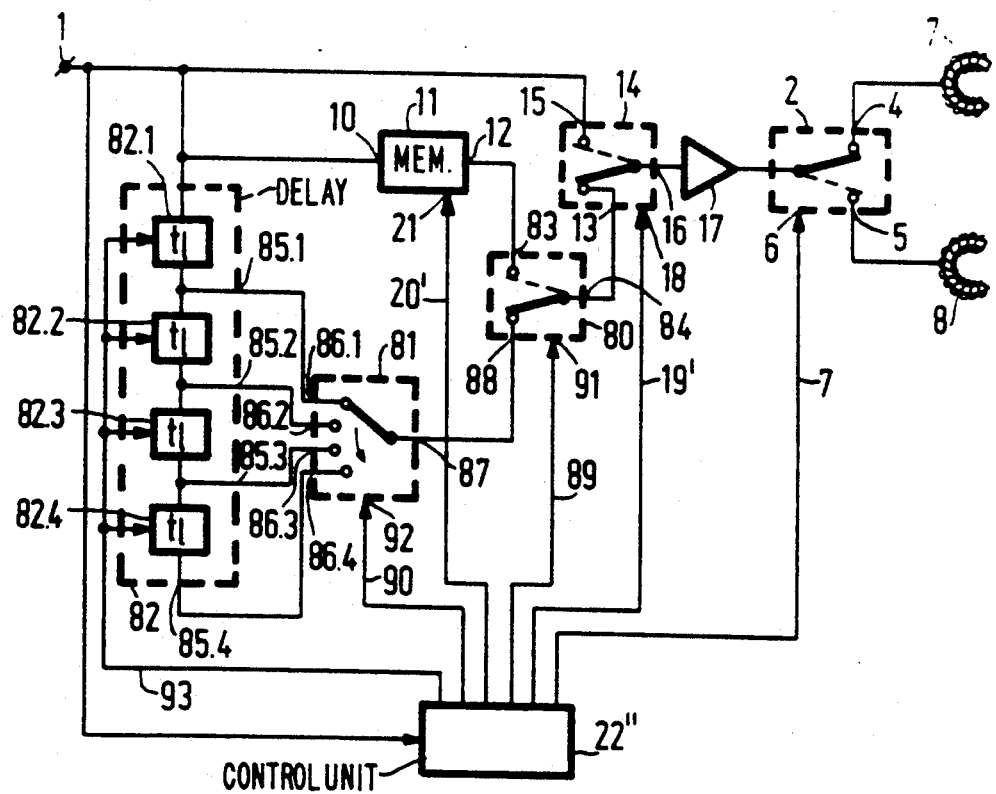
FIG. 9 shows a third apparatus for recording the video signal.

FIG. 9 shows an apparatus for recording a video signal, for example, a D2-MAC or a C-MAC signal, on a magnetic record carrier. The apparatus is intended for carrying out the method as described with reference to FIG. 7a. The apparatus bears much resemblance to the apparatus shown in FIG. 3. The differences are as follows. The apparatus comprises third and fourth switching means 80 and 81 and a delay means 82. The output 12 of the memory 11 is coupled to a first input 83 of the third switching means 80, having an output 84 coupled to the first input 13 of the second switching means 14. The delay means 82, which comprises four delay means sections, each of which provides a delay by one line period $t_1$, has four tappings 85.1 to 85.4. Each tapping is coupled to an associated input 86.1 to 86.4 of the fourth switching means 81. The output 87 of the fourth switching means 81 is coupled to the second input 88 of the third switching means 80. The third and fourth switching means 80 and 81 are constructed to couple one of the inputs to the output under the influence of control signals 89 and 90 respectively applied to the control input 91 and 92, respectively, of the third and fourth switching means 80 and 81. The control unit 22' further supplies a control signal 93 to the delay means 82.

The apparatus operates as follows. The second switching means 14 are in the upper position. In accordance with FIG. 7a, the signal block $F_1$ is first supplied to the input terminal 1. At this instant, switching over is effected from recording by means of one write head 8 to recording by means of the other write head 7, i.e. the first switching means 2 are set to the upper position. This means that the signal block $F_1$ cannot be recorded on the record carrier. Moreover, a control signal appears via the line 93, so that the signal block $F_1$ is shifted into the first delay means section 82.1. Subsequently, the signal block $S_1$ is applied to the input terminal 1 and is applied to the write head 7 via the first switching means 2 so as to be recorded. Subsequently, the signal block $F_2$ is applied to the input terminal 1. The second switching means 14 are set to the lower position. Under the influence of the control signal 93, the signal block $F_1$ is read out of the first delay means section 82.1 and applied to the write head 7 via the tapping 85.1, the fourth switching means 81 (in the upper position) and the second and first switching means 14 and 2 and is recorded on the record carrier. Moreover, under the influence of the control signal 93, the signal block $F_1$ is shifted into the second delay means section 82.2 and the signal block $F_2$ is shifted into the first delay means section 82.1. Subsequently, when the signal block $S_2$ appears on the input terminal 1, the second switching means 14 are set to the upper position and the signal block $S_2$ is recorded on the tape. Now the signal block $F_3$ is applied to the input terminal 1. The second switching means 14 are again set to the lower position and under the influence of the control signal 93: (a) the signal block $F_1$ is read out of the delay means section 82.2 and shifted into the delay means section 82.3, (b) the signal block $F_2$ is read out of the delay means section 82.1 and recorded on the record carrier and the signal block $F_3$ shifted into the delay means section 82.2, and (c) the signal block $F_3$ is shifted into the delay means section 82.1. Subsequently, the signal $S_3$ is read in (second switching means 14 in the upper position). By setting the second switching means 14 alternately to the upper and the lower position, $F_3$, $S_4$, $F_4$, $S_5$, ..., $F_{i-2}$, $S_{i-1}$ are subsequently recorded. Now $F_i$ is applied to the input terminal 1. Under the influence of the control signal 93, the information is shifted in the delay means sections and the signal block $F_i$ is read into the first delay means section 82.1. Since at this instant the first switching means 2 are set to the lower position, the signal block $F_{i-1}$ appearing on the tapping 85.1 is not read in. After this, the signal block $S_i$ is applied to the input terminal 1 and, via the second and first switching means 14 and 2, applied to the write head 8 so as to be recorded. Now the signal block $F_{i+1}$ is applied to the terminal 1. Under the influence of the control signal 93, the information is advanced one position in the delay means 82. This means inter alia that the block $F_{i-1}$ is shifted out of the delay means section 82.2, appears on the tapping 85.2 and is also shifted into the delay means section 82.3. Moreover, under the fourth influence of the control signal 90, the switching means 81 are set one position further. This means that the input 86.2 is now connected to the output 87. Consequently, the block $F_{i-1}$ is recorded by means of the write head 8 via the fourth through the first switching means 81, 80, 14 and 2. Subsequently, the signal block $S_{i+1}$ is applied to the terminal 1 and recorded via the second and first switching means 14 and 2. After this, the signal blocks $F_i$, $S_{i+2}$, $F_{i+1}$, $S_{i+3}$, ..., $F_{j-3}$, $S_{j-1}$ are recorded with the second switching means 14 alternately in the upper and lower position.

After this, the block $F_j$ is applied to the input terminal 1. Under the influence of the control signal 7, the first switching means 2 are reset to the upper position. Moreover, under the influence of the control signal 93, the information is shifted in the delay means 82 (i.e. block $F_{-j-1}$ is shifted to the delay means section 82.2, the block $F_{j-2}$ to the delay means section 82.3 and the block $F_{j-3}$ to the delay means section 82.4) and the block $F_j$ is shifted into the delay means section 82.1. After this, the signal block $S_j$ is applied to the terminal 1 and recorded by the write head 7. Subsequently, the block $F_{j+1}$ is applied. The switching means 14 are set to the lower position and the switching means 81 are set to the position in which the input 86.3 is coupled to the output 87. Under the influence of the control signal 93, the information is advanced one position in the delay means 82, i.e. the block $F_{j-1}$ is shifted into the delay means section 82.4 and is applied to the write head 7 via the four switching means 81, 80, 14 and 2 so as to be recorded on the record carrier.

Subsequently, the signal blocks $S_{j+1}$, $F_{j-1}$, $S_{j+2}$, $F_j$, ..., $F_{k-4}$, $S_{k-1}$ are recorded. At the instant at which $F_k$ is applied to the terminal 1, the first switching means 2 are set to the lower position, the information is advanced in the delay means 82 and the block $F_k$ is read into the delay means section 82.1. This means that the blocks $F_{k-3}$ is shifted to the delay means section 82.4 and is not recorded at this instant as a result of the change-over to the write head 8. Subsequently, $S_k$ is applied to the terminal 1 and recorded on the record carrier. After this, the block $F_{k+1}$ is applied to the terminal 1 and under the influence of the control signals 93, the information is advanced in the delay means 82, so that the block $F_{k-3}$ appears on the tapping 85.4. Since the switching means 81 are set to the lower position under the influence of the control signal 90, this block $F_{k-3}$ is recorded on the record carrier. Subsequently, the blocks $S_{k+1}$, $F_{k-2}$, $S_{k+2}$, $F_{k-1}$, $S_{k+3}$, ..., $F_{n-9}$, $S_{n-5}$ are recorded.

Subsequently, the signal block $F_{n-4}$ is applied to the terminal 1. Under the influence of the control signal 93, the information is advanced one position in the delay means 82. This means that $F_{n-8}$ is shifted out of the delay means section 82.4 and is recorded on the record carrier. After this, $S_{n-4}$ is applied to the terminal 1 and recorded. Subsequently, $F_{n-3}$ appears on the terminal 1. Under the influence of the control signal 20', $F_{n-3}$ is loaded into the memory 11. Under the influence of the control signal 93, the information is advanced in the delay means 82, so that the block $F_{n-7}$ is recorded by the write head 8 via the four switching means 81, 80, 14 and 2. Subsequently, $S_{n-3}$ is recorded. After this, $F_{n-2}$ appears on the terminal 1 and is loaded into the memory 11 under the influence of the control signal 20'. Moreover, the block $F_{n-6}$ and then the block $S_{n-2}$ are recorded on the record carrier. Subsequently, $F_{n-1}$ appears on the terminal 1 and is stored in the memory 11. Moreover, the block $F_{n-5}$ and then the block $S_{n-1}$ are recorded on the record carrier. Now the block $F_n$ appears on the terminal 1 and is also recorded on the record carrier. In addition, the block $F_{n-4}$ is recorded on the record carrier.

Subsequently, the third switching means 80 are set to the upper position and at the instant at which the block $S_n$ is applied to the terminal 1, the second switching means 14 remain in the lower position and under the influence of the control signal 20', the blocks $F_{n-3}$ to $F_n$ are read out of the memory 11 and recorded on the record carrier instead of the signal block $S_n$. The process described above is repeated for successive fields.

Figure 10:
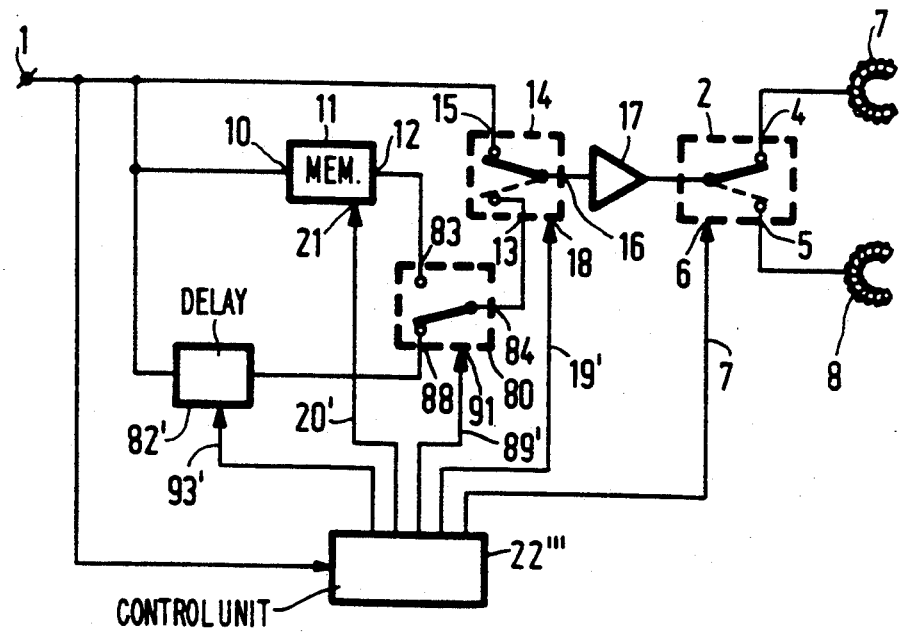
FIG. 10a shows a fourth apparatus for recording the video signal.

FIG. 10 shows an apparatus for recording a video signal, by means of which the method described with reference to FIG. 8a can be carried out. At the instant at which the blocks $F_1$, $S_1$, $F_2$, $S_2$, $F_3$, $S_3$, $F_4$ and $S_4$ are applied, a change-over to the write head 7 occurs, so that these blocks cannot be recorded on the record carrier. However, under the influence of the control signal 93', the blocks $F_1$, $F_2$, $F_3$ and $F_4$ are shifted into the delay means 82', which provides a delay by four line periods. This means that if subsequently the block $F_5$ is applied to the terminal 1 and is shifted into the delay means 82' under the influence of the control signal 93', the block $F_1$ appears on the output under the influence of the same control signal 93' and is applied to the write head 7 via the third and second switching means 80 and 14 (both in the lower position) and the first switching means 2 (in the upper position) so as to be recorded. Subsequently, with the second switching means 14 alternately in the upper position and the lower position the blocks $S_5, F_2, S_6, F_3, \ldots, F_{n-8}, S_{n-4}$ are recorded. After this, the block $F_{n-3}$ is applied to the terminal 1. Under the influence of the control signal 20', this block is loaded into a memory 11. At the same time, $F_{n-7}$ is recorded on the record carrier, followed by $S_{n-3}$. Subsequently, the block $F_{n-2}$ appears on the terminal 1. This block is also loaded into the memory 11, while $F_{n-6}$ and subsequently $S_{n-2}$ are recorded on the record carrier. After this, the block $F_{n-1}$ appears on the terminal 1. This block is loaded into the memory 11, while $F_{n-5}$ and subsequently $S_{n-1}$ are recorded on the record carrier. Then $F_n$ is applied to the terminal 1 and is stored in the memory 11, while at the same time, $F_{n-4}$ is shifted out of the delay means 82' and recorded on the record carrier. Finally, $S_n$ is applied to the terminal 1. At this instant, the third switching means 80 change over to the upper position and the second switching means 14 remain in the lower position. Under the influence of the control signal 20', the blocks $F_{n-3}$ to $F_n$ are shifted out of the memory 11 and are recorded on the record carrier, instead of the block $S_n$. This process is repeated for successive fields.

Figure 11:
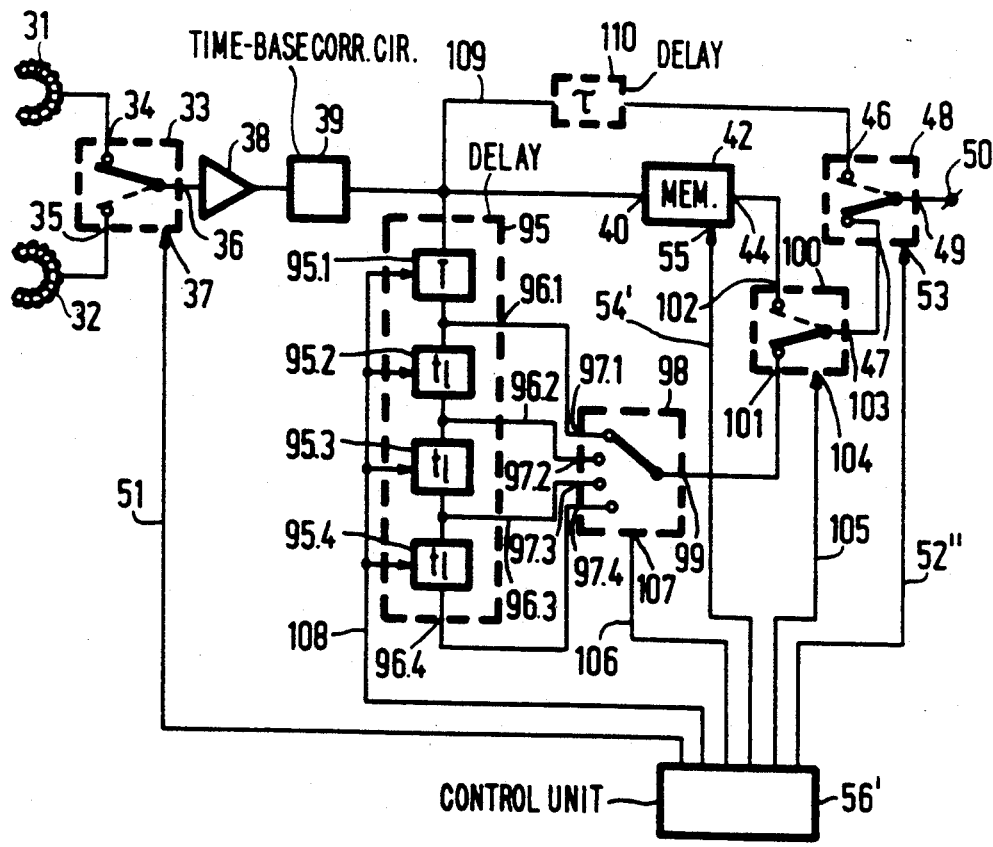
FIG. 11 shows a third apparatus for reading the video signal.

FIG. 11 shows an apparatus for reading a video signal from the record carrier in accordance with the method as described with reference to FIGS. 7b and 7c. The apparatus bears some resemblance to the apparatus shown in FIG. 5 or FIG. 6. The output of the time-base correction circuit 39 is coupled to a delay means 95 comprising four delay means sections 95.1 to 95.4 and four tappings 96.1 to 96.4. The output of the memory 42 is coupled to a first input 102 of third switching means 100, having an output 103 coupled to the first input 47 of the second switching means 48. The tappings 96.1 to 96.4 of the delay means 95 are coupled to associated inputs 97.1 to 97.4 of fourth switching means 98, which have an output 99 coupled to a second input 101 of the third switching means 100. The third and fourth switching means 100 and 98 are constructed to couple one of the inputs to the output under the influence of control signals 105 and 106 respectively applied to a respective control input 104 and 107 of the two switching means 100 and 98. The delay means 95 receive a control signal 108 from the control unit 56'. The apparatus operates as follows.

The last part of the field B1 is read with the first switching means 33 in the lower position. At the instant at which the second signal block $S_n$ of the field B1 appears on the output 36, the content of this block, specifically the first signal blocks $F_{n-1}$ to $F_n$, is loaded into the memory 42 under the influence of the control signal 54'. At this instant, all the first signal blocks $F_1$ to $F_{n-4}$ are stored in the delay means 95. This means that the block $F_1$ is situated in the delay means section 95.4, the block $F_2$ in the delay means section 95.3, the block $F_3$ in the delay means section 95.2 and the blocks $F_4$ to $F_{n-4}$ in the delay means section 95.1. This means that the delay means 95 provide an overall delay time $T+3t_1$ equal to one field period minus one line period, in other words T is equal to one field period minus four line periods. This means that the delay means section 95.1 contains the data stream of first signal blocks as shown in FIG. 7c, except for the first (upper) hatched data block in FIG. 7c.

Hereinafter, it will be described how the first signal blocks of the field B1 are inserted between the second signal blocks of the field B2. At the instant at which the first switching means 33 are set to the upper position, the information is advanced one position in the delay means 95 under the influence of the control signal 108. This means that (a) block $F_1$ is read out of the delay means section 95.4 and applied to the output terminal 50 via the fourth switching means 98 (in the lower position) and the third and second switching means 100 and 48 (both in the lower position), (b) blocks $F_2, F_3$ and $F_4$ are now shifted into the delay means sections 95.4, 95.3 and 95.2, and the delay means section 95.1 now contains blocks $F_5$ to $F_{n-4}$ of the field B1 and one block of the field B2 which does not contain any information as a result of the change-over to the (other) read head 31. The block $S_1$ of the field B2 is now applied to the terminal 50 via the circuit 109 and the second switching means 48 (in the upper position). Subsequently, the blocks $F_1, S_2, F_2, S_3, \ldots, F_{i-3}, S_{i-2}$, of the field B2 are read out in this order. The blocks $F_1$ to $F_{i-3}$ of the field B2 are shifted into the delay means section 95.1, while at the same time, the blocks $F_2$ to $F_{i-2}$ of the field B1 are shifted out of the delay means section 95.4 and these signal blocks are combined with (inserted between) the blocks $S_2$ to $S_{i-2}$ of the field B2 via the second switching means 48 which are alternately set to the lower and the upper position.

Subsequently, $F_{i-2}$ of the field B2 is read out. At this instant, the delay means section 95.4 does not contain any useful information and the delay means section 95.3 contains the block $F_{i-1}$ (see also FIG. 7c, the shaded block above $F_{i-1}$ and the block $F_{i-1}$ itself). Before the information is advanced one position in the delay means 95 and the block $F_{i-2}$ is shifted into the delay means section 95.1, the fourth switching means 98 are set to the next lowest position. If the information is now advanced in the delay means, under the influence of the control signal 108, the block $F_{i-1}$ appearing on the tapping 96.3 is applied to the terminal 50 via the three switching means 98, 100 and 48. Subsequently, the fourth switching means 98 are set to the upper position and the block $S_{i-1}$ of the field B2 is read out and applied to the terminal 50. Subsequently, with the second switching means 48 alternately in the upper position and the lower position, the signal blocks $S_i$ to $F_{j-3}$ of the field B1, which each time appear on the tapping 95.3, are combined with (inserted between) the blocks $S_i$ to $S_{j-3}$ of the field B2. At this instant, the delay means section 95.3 does not contain any (useful) information and the delay means section 95.2 contains the block $F_{j-2}$ (see also FIG. 7c), the shaded block above $F_{j-2}$ and the block $F_{j-2}$ itself. Before the next first signal block of the field B2 read from the record carrier is shifted into the delay means 95, the fourth switching means 98 are set to the position in which the input 97.2 is coupled to the output 99. This means that while the information is advanced one position in the delay means, the block $F_{j-1}$ appears on the terminal 50 via the tapping 96.2 and the three switching means 98, 100 and 48. Subsequently, $S_{j-2}$ (B2), $F_{j-1}$ (B1), $S_{j-1}$ (B2), $\ldots F_{k-4}$ (B1), $S_{k-2}$ (B2) appears, the parenthesized references indicating the field to which the relevant block belongs.

At this instant, the delay means section 95.2 does not contain any (useful) information and the last position of the delay means section 95.1 contains the block $F_{k-3}$ (see also FIG. 7c, the hatched block above $F_{k-3}$ and the block $F_{k-3}$ itself). Before the information is advanced one position in the delay means 95, the fourth switching means 98 are set to the upper position. When the information is shifted in the delay means 95, the block $F_{k-3}$ appears on the tapping 96.1, which block is applied to the terminal 50 via the three switching means 98, 100 and 48. Subsequently, $S_{k-3}$ (B2), $F_{k-2}$ (B1), $S_{k-2}$ (B2), ..., $F_{n-4}$ (B1), $S_{n-4}$ (B2) appear on terminal 50.

After this, the third switching means 100 are set to the upper position and the block $F_{n-3}$ (B1) is read out of the memory 42 and applied to the terminal 50 via the third and second switching means 100 and 48. Subsequently, $S_{n-3}$ (B2) is read out and applied to the terminal 50. After this, $S_{n-3}$ (B2) is read out and applied to the terminal 50. Subsequently, $S_{n-3}$ (B2) is read out and applied to the terminal 50. Then $F_{n-2}$ (B1) is read out of the memory 42 and supplied to the terminal 50, followed by the block $S_{n-2}$ (B2). Now $F_{n-1}$ (B1) is read out of the memory 42 and applied to the terminal 50, followed by $S_{n-1}$ (B2). After $F_n$ (B1) has been read out of the memory 42 and applied to the terminal 50, $S_n$ (B2) is read from the record carrier and read into the memory 42. At this instant, the signal blocks $F_1$ (B2) to $F_{n-4}$ (B2) are present in the delay means 95 and the signal blocks $F_{n-3}$ (B2) to $F_n$ (B2) are contained in the memory 42.

This process is repeated for successive fields. The circuit 109 may include a further (analog) delay means 110. This delay means may provide a delay of, for example, one field period. In that case first and second signal blocks of the same field are combined with each other.

Figure 12:
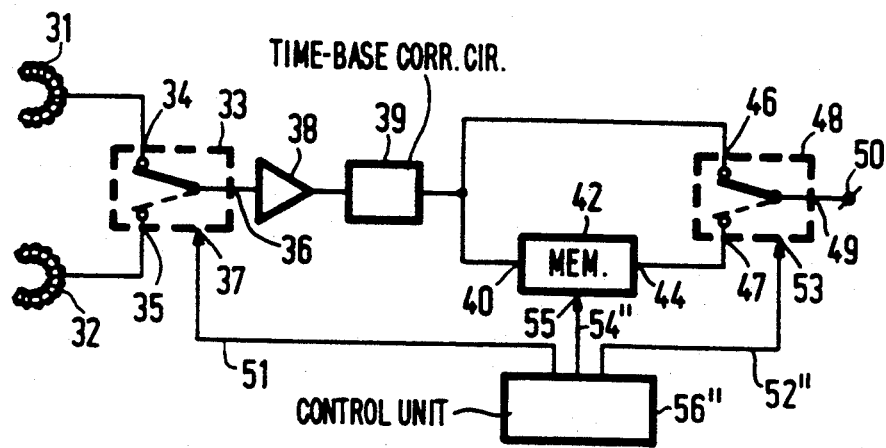
FIG. 12 shows a fourth apparatus for reading the video signal.

FIG. 12 shows a read apparatus for carrying out the method as described with reference to FIGS. 8b and 8c. The second switching means 48 are in the upper position and subsequently, the read head 31 reads the blocks $F_1$, $S_5$, $F_2$, $S_6$, ..., $F_{n-5}$, $S_{n-1}$ and $F_{n-4}$ from a track on the record carrier. These blocks are applied to the output terminal 50. Subsequently, the read head 31 reads the block $S_n$, containing the first signal blocks $F_{n-3}$ to $F_n$. Under the influence of the control signal 54", these blocks are loaded into the memory 42. Subsequently, the change-over to the next read head 32 occurs during four line periods. During this change-over, the control unit 56" supplies, four times, a control signal 54" to the memory 42, so that the blocks $F_{n-3}$, $F_{n-2}$, $F_{n-1}$ and $F_n$ appear on the output terminal 50 at the correct instants. Obviously, the second switching means 48 are then in the lower position.

This process is repeated for succeeding fields.

What is claimed is:

1. A method of recording a video signal in tracks which are inclined relative to the longitudinal direction of a magnetic record carrier in the form of a tape by means of a plurality of write heads mounted on a rotatable head drum, in which said write heads are cyclically changed over from one to another during the recording of the video signal, the video signal comprising a sequence of lines each having a first signal block containing a line synchronizing signal and a second block containing chrominance and luminance information of the video signal, the first signal blocks each containing at least one additional signal in addition to the line synchronizing signal, characterized in that for preserving at least the additional signal that would otherwise be lost during time when said write heads are cyclically changed over from one to another, said method of recording a video signal comprises the steps:

storing in a memory the at least one additional signal occurring in a specific first signal block of the video signal;

inserting said stored at least one additional signal in one or more specific second signal blocks associated with one or more non-relevant lines in the video signal, thereby forming a modified video signal, said non-relevant lines corresponding to lines in the video signal which occur outside of the display interval of a television picture signal; and recording said modified video signal on said magnetic record carrier, wherein said specific second signal blocks containing said at least one additional signal are recorded in a track on the record carrier.

2. A method of recording a video signal as claimed in claim 1, characterized in that said method of recording a video signal comprises:

changing over from recording with one of said plurality of write heads to another of said plurality of write heads only once in each field in the recording of said modified video signal;

storing in said memory the at least one additional signal in each of the first signal blocks associated with a non-zero integer number (x) of successive lines occurring during said change-over of said write heads; and inserting said stored at least one additional signal from each of the first signal blocks associated with said (x) number of successive lines in one or more specific second signal blocks associated with one or more non-relevant lines in the video signal, thereby forming said modified video signal.

3. A method of recording a video signal as claimed in claim 1, characterized in that said method of recording a video signal comprises:

changing over from recording with one of said plurality of write heads to another of said plurality of write heads a non-zero integer number (m) of times in each field in the recording of said modified video signal;

storing in said memory at least the at least one additional signal in each of the first signal blocks in (m) number of lines respectively occurring during said (m) number of change-overs of said write heads; and inserting said stored at least one additional signal from each of the first signal blocks in said (m) number of lines in one or more specific second signal blocks associated with one or more non-relevant lines in the video signal forming said modified video signal.

4. A method of recording a video signal as claimed in claim 1, characterized in that said method of recording a video signal comprises:

delaying at least the at least one additional signal occurring in said specific first signal block of the video signal for one or more line periods such that it occurs during a subsequent first signal block;

storing in said memory the at least one additional signal originally occurring in said subsequent first signal block; and inserting said stored at least one additional signal in one or more specific second signal blocks associated with one or more non-relevant lines in the video signal.

5. A method of recording a video signal as claimed in claim 4, characterized in that said method of recording a video signal comprises:

changing over from recording with one of said plurality of write heads to another of said plurality of write heads only once in each field in the recording of said modified video signal;

delaying at least the at least one additional signal of each of the first signal blocks associated with a non-zero integer number (x) of successive lines occurring during said change-over of said write heads by at least (x) number of line periods;

inserting said delayed at least one additional signal of each of the first signal blocks of said (x) number of successive lines in (x) number of subsequent first signal blocks;

storing in said memory the at least one additional signal originally occurring in each of said (x) number of subsequent first signal blocks prior to said insertion of said delayed at least one additional signal of each of the first signal blocks of said (x) number of successive lines; and inserting said stored at least one additional originally occurring in each of said (x) number of subsequent first signal blocks into one or more specific second signal blocks associated with one or more non-relevant video lines.

6. A method of recording a video signal as claimed in claim 4, characterized in that said method of recording a video signal comprises:

changing over from recording with one of said plurality of write heads to another of said plurality of write heads a non-zero integer number (m) of times in each field in the recording of said modified video signal;

delaying the at least one additional signal of each of the (m) number of first signal blocks occurring during said (m) number of change-overs of said write heads by at least one line period;

inserting each of said delayed at least one additional signal of each of said (m) number of first signal blocks into (m) number of subsequent first signal blocks;

storing the at least one additional signal originally occurring in each of said (m) number of subsequent first signal blocks prior to said insertion of said delayed at least one additional signal of each of said (m) number of first signal blocks; and inserting said stored at least one additional signal originally occurring in each of said (m) number of subsequent first signal blocks in one or more specific second signal blocks associated with one or more non-relevant video lines.

7. An apparatus for recording a video signal in tracks which are inclined relative to the longitudinal direction of a magnetic record carrier in the form of a tape by means of a plurality of write heads mounted on a rotatable head drum, the video signal comprising a sequence of lines, each with a first signal block containing a line synchronizing signal and a second signal block containing chrominance and luminance information of the video signal, the first signal blocks containing at least one additional signal in addition to the line synchronizing signal, wherein during recording, at least the additional signal in a specific first signal block is stored in a memory and is subsequently accommodated in one or more second signal blocks associated with one or more non-relevant lines in the video signal, said non-relevant lines corresponding to lines which occur outside of the display interval of the television picture signal, after which said one or more second signal blocks are recorded in a track on the record carrier, the apparatus comprising:

an input terminal to which said video signal to be recorded is applied;

first switching means, for cyclically changing over from recording with one of said plurality of write heads to another of said plurality of write heads, having an input, a plurality of outputs and a control input, said first switching means coupling the input to one of the outputs under the influence of a first control signal applied to the control input, each output of said first switching means being coupled to an associated write head;

a memory, having an input, a control input and an output, for storing the at least one additional signal in said first signal block at the instant of changing over from recording with one write head to recording with another write head, under the influence of a second control signal applied to the control input of said memory, the input of said memory being coupled to the input terminal at least at the instant of said changing over of said write heads;

second switching means having a first and a second input, an output, and a control input, the output of said memory being coupled to the first input of said second switching means and the output of said second switching means being coupled to the input of said first switching means, said second switching means coupling one of the first and second inputs to the output under the influence of a third control signal applied to the control input of said second switching means such that the first input is coupled to the output at the instant at which the one or more second signal blocks associated with the non-relevant lines in the video signal are recorded; and control means for generating said first, second and third control signals.

8. An apparatus as claimed in claim 7, characterized in that the input terminal is coupled to the second input of the second switching means.

9. An apparatus as claimed in claim 7 or 8, characterized in that the memory stores, under the influence of the second control signal, the at least one additional signal of each of those first signal blocks associated with a non-zero integer number x of successive lines during which changing over of write heads is effected.

10. An apparatus as claimed in claim 7 or 8, characterized in that said memory stores, under the influence of the second control signal, the at least one additional signal of each of an integer number m of first signal blocks during which changing over of write heads is effected.

11. An apparatus for reproducing a video signal from a modified video signal recorded on a record carrier, in which the video signal comprises a sequence of lines with a first signal block containing a line synchronizing signal and a second signal block containing chrominance and luminance information of the video signal, the first signal blocks containing at least one additional signal in addition to the line synchronizing signal, said modified video signal having been formed by removing the at least one additional signal in a specific first signal block and inserting this removed at least one additional signal in one or more second signal blocks associated with one or more non-relevant lines in the video signal, said non-relevant lines corresponding to lines which occur outside of the display interval of a television picture signal, said apparatus for reproducing the video signal comprising:
a plurality of read heads;
first switching means for cyclically changing over from reading with one of said plurality of read heads to another of said plurality of read heads, said first switching means having two or more inputs respectively coupled to said read heads, an output and a control input, said first switching means coupling one of said inputs to the output under the influence of a first control signal applied to the control input;
an output terminal for supplying the reproduced video signal;
a memory for storing, under the influence of a second control signal applied to a control input of the memory, the at least one additional signal contained in the one or more second signal blocks in the modified video signal read from the track of the record carrier, said memory having an input coupled to the output of the first switching means at least at the instant at which the one or more second signal blocks in the non-relevant lines are read, and an output;
delay means for delaying at least the first signal block in each line in the modified video signal read from the track, said delay means having an input coupled to the output of the first switching means, and an output;
second switching means having a first and a second input coupled, respectively, to the outputs of said memory and said delay means, and an output, said second switching means coupling one of its first and second inputs to its output under control of a third control signal applied to a control signal input of said second switching means, whereby the first input of said second switching means is coupled to the output of said second switching means during the time of changing over of read heads, delayed by the time interval T, from reading with one of said read heads to another of said read heads; and
control means for generating said first, second and third control signals.

12. An apparatus as claimed in claim 11, characterized in that the output of the second switching means is coupled to the output terminal of the apparatus.

13. An apparatus as claimed in claim 11, characterized in that said apparatus further comprises a third switching means having an input, a first and a second output, and a control signal input, and a fourth switching means having a first and a second input, an output and a control signal input, the output of the first switching means being coupled to the input of the third switching means, the first and second outputs of the third switching means being coupled, respectively, to the inputs of the memory and the delay means, the output of the second switching means being coupled to the first input of the fourth switching means, the second input of the fourth switching means being coupled to the first output of the third switching means, the output of the fourth switching means being coupled to the output terminal, wherein the third switching means couples the input to one of the first and second outputs under the influence of a fourth control signal applied to the control signal input of the third switching means, while the fourth switching means couples one of the first and second inputs to the output under the influence of a fifth control signal applied to the control signal input of the fourth switching means, the input and the first output of the third switching means being coupled to each other during reading of the one or more second signal blocks, said control means further generating said fourth and fifth control signals.

14. An apparatus for reproducing a video signal from a modified video signal recorded on a record carrier as claimed in claim 11, 12 or 13, said modified video signal having been formed by removing the at least one additional signal of each of those first signal blocks associated with a non-zero integer number (x) of successive lines in said video signal which would have occurred during a change-over of write heads and inserting said removed at least one additional signal of each of the (x) number of first signal blocks in one or more specific second signal blocks associated with one or more non-relevant lines in the video signal, characterized in that said memory stores, under control of said second control signal, the at least one additional signal of each of the (x) number of first signal blocks contained in the second signal blocks in the modified video signal read from the track of the record carrier, and the second switching means couples its first input to its output during the time of changing over of read heads, delayed by the time interval T, from reading with one of said read heads to another of said read heads.

15. An apparatus as claimed in claim 13, in which the signal contained in the second signal blocks is an analog signal, characterized in that said apparatus comprises a further delay means arranged between the first output of said third switching means and the first input of said fourth switching means, said further delay means providing a delay substantially equal to the delay time of said delay means.

16. An apparatus for reproducing a video signal from a modified video signal recorded on a record carrier as claimed in claim 11, 12 or 13, said modified video signal having been formed by removing the at least one additional signal of each of those first signal blocks associated with a non-zero integer number (m) of lines in each field of said video signal which would have occurred during (m) change-overs of write heads, and inserting said removed at least one additional signals in one or more specific second signal blocks associated with one or more non-relevant lines in the video signal, characterized in that said memory stores, under control of the second control signal, the at least one additional signal of each of the (m) number of first signal blocks contained in the specific second signal blocks in the modified video signal read from the track of the record carrier, and said second switching means couples the first input to the output during the (m) number of change-over times, delayed by the time interval T.

17. An apparatus for recording a video signal in tracks which are inclined relative to the longitudinal direction of a magnetic record carrier in the form of a tape by means of a plurality of write heads mounted on a rotatable head drum, the video signal comprising a sequence of lines with a first signal block containing a line synchronizing signal and a second signal block containing chrominance and luminance information of the video signal, each of the first signal blocks containing at least one additional signal in addition to the line synchronizing signal, wherein during recording, at least the at least one additional signal in a specific first signal block is removed and subsequently inserted in one or more specific second signal blocks associated with one or more non-relevant lines in the video signal, said nonrelevant lines corresponding to lines which occur outside of the display interval of the television picture signal, after which said signal blocks are recorded in a track on the record carrier, and wherein at least the at least one additional signal in a first signal block during which changing over from recording with one write head to recording with another write head is effected, is delayed by one or more line periods and is subsequently accommodated in a subsequent first signal block and recorded on the record carrier, while the at least one additional signal originally occurring in said subsequent first signal block prior to the insertion of the delayed at least one additional signal is subsequently accommodated in the specific second signal block and recorded on the record carrier, characterized in that the apparatus comprises:

an input terminal for receiving the video signal to be recorded;

a plurality of write heads;

first switch means, for cyclically changing over from recording with one of said plurality of write heads to another of said plurality of write heads, having an input, two or more outputs, and a control input, said first switching means coupling the input to one of the outputs under the influence of a first control signal applied to the control input, the input terminal being coupled to the input of said first switching means and each output of said first switching means being coupled to an associated write head;

a memory, having an input, an output, and a control signal input, for storing the at least one additional signal originally occurring in said subsequent first signal block under the influence of a second control signal applied to the control signal input of said memory, the input of said memory being coupled to said input terminal at least at the instant at which said subsequent first signal block is applied to the input terminal;

second switching means having a first and a second input, an output, and a control signal input, the output of said memory being coupled to the first input of said second switching means and the output of said second switching means being coupled to the input of said first switching means, said second switching means coupled one of the first and second inputs to the output under the influence of a third control signal applied to a control signal input of said second switching means such that the first input is coupled to the output at the instant of recording of one or more second signal blocks associated with one or more non-relevant lines in the video signal; and control means for generating said first, second and third control signals.

18. An apparatus as claimed in claim 17, wherein said first switching means changes over said write heads from recording with one of said write heads to another of said write heads only once during each field under the influence of said first control signal, and wherein during recording, the at least one additional signal of each of those non-zero integer number (x) of first signal blocks associated with successive (x) number of lines during which the change-over of write heads occurs, are delayed by at least (x) number of line periods and are subsequently inserted into (x) number of subsequent first signal blocks, and the at least one additional signal originally occurring in each of said (x) number of subsequent first signal blocks prior to insertion of said delayed at least one additional signal of each of said (x) number of first signal blocks are stored and subsequently inserted into one or more subsequent second signal blocks associated with one or more non-relevant video lines, characterized in that said apparatus further comprises:

delay means for delaying for a period of at least (x) number of line periods at least the (x) number of first signal blocks associated with the (x) number of successive lines during which said change-over of write heads occurs, said delay means having an input coupled to said input terminal and an output; and third switching means having a first and a second input, an output and a control input, the outputs of the delay means and said memory being coupled to, respectively, the first and second inputs of said third switching means, and the output of said third switching means being coupled to the first input of said second switching means, said third switching means coupling one of the first and second inputs to the output under the influence of a fourth control signal applied to the control signal input of said third switch means, said control means generating said fourth control signal, and said memory storing the at least one additional signal in each of said (x) number of subsequent first signal blocks.

19. An apparatus as claimed in claim 17, wherein said first switching means changes over said write heads from recording with one of said write heads to another of said write heads a non-zero integer number (m) of time during each field, and wherein during recording, the at least one additional signal of each of those (m) number of first signal blocks during which said (m) number of change-overs of said write heads occur, are each delayed by at least one line period and are subsequently inserted into (m) number of subsequent first signal blocks, and the at least one additional signal originally occurring in each of said (m) number of subsequent first signal blocks prior to said insertion of said delayed at least one additional signal of said (m) number of first signal blocks, are stored and subsequently inserted into one or more subsequent second signal blocks associated with one or more non-relevant video lines, characterized in that said apparatus further comprises:

delay means for delaying for at least one line period at least the (m) number of first signal blocks occurring during said (m) number of change-overs of said write heads, said delay means having an input coupled to the input terminal, and (m) number of output tappings;

third switching means having a first and a second input, an output, and a control signal input, the output of said memory being coupled to the first input of said third switching means while the output of said third switching means being coupled to the first input of the second switching means; and fourth switching means having (m) number of inputs, an output, and a control signal input, the (m) number of output tappings of said delay means being coupled, respectively, to said (m) number of inputs of said fourth switching means, and the output of said fourth switching means being coupled to the second input of said third switching means, said third and fourth switching means coupling, respectively, one of the inputs to the output under the influence of a fourth and a fifth control signal applied, respectively, to the control signal inputs of said third and fourth switching means, and said control means generating said fourth and fifth control signals.

20. An apparatus for reproducing a video signal from a modified video signal recorded in tracks which are inclined relative to the longitudinal direction of a magnetic record carrier in the form of a tape, in which the video signal comprises a sequence of lines with a first signal block containing a line synchronizing signal and a second signal block containing chrominance and luminance information of the video signal, the first signal blocks containing at least one additional signal in addition to the line synchronizing signal, said modified video signal having been formed by delaying for one or more line periods the at least one additional signal in a specific first signal block in the video signal which would have occurred during a changing over from recording with one write head to recording with another write head, inserting the delayed at least one additional signal into a subsequent first signal block, delaying the at least one additional signal originally occurring in said subsequent first signal block prior to the insertion of said delayed at least one additional signal, and then inserting the delayed subsequent first signal block at least one additional signal into one or more subsequent second signal blocks associated with one or more non-relevant video lines, characterized in that said apparatus comprises:
- a plurality of read heads;
- first switching means, for cyclically changing over said read heads, having a plurality of inputs respectively coupled to said read heads, an output and a control signal input, said switching means coupling one of said plurality of inputs to the output under the influence of a first control signal applied to the control signal input;
- an output terminal for supplying the video signal;
- memory means, having an input, an output and a control signal input, for storing, under control of a second control signal applied to the control signal input, the at least one additional signal occurring in the one or more subsequent second signal blocks in the non-relevant lines in the modified video signal read from the track, the input of said memory means being coupled to the output of the first switching means at least at the instant at which the second signal blocks are read;
- second switching means having a first and a second input, an output, and a control signal input, the output of said memory means being coupled to the first input of said second switching means, and the output of said second switching means being coupled to said output terminal, said second switching means coupling one of the first and second inputs to the output under the influence of a third control signal applied to the control signal input of the second switching means such that the first input is coupled to the output at the instant at which the relevant subsequent first signal block of the modified video signal is read from the track; and
- control means for generating said first, second and third control signals.

21. An apparatus as claimed in claim 20, wherein during the recording of said video signal, the write heads changed over only once in each field and the at least one additional signal in each of the first signal blocks associated with a non-zero integer number (x) of successive lines occurring during the change-over of the write heads are stored and are then inserted in one or more specific second signal blocks associated with one or more non-relevant lines in the video signal, thereby forming the modified video signal, wherein said first switching means changes over said read heads from reading with one of said plurality of heads to another of said plurality of heads only once in each field period under the influence of said first control signal, and wherein during reading, the at least one additional signal of each of said first signal blocks of said (x) number of successive lines are extracted from said one or more subsequent second signal blocks in the non-relevant lines in the modified video signal, and are subsequently re-inserted into (x) number of subsequent first signal blocks, characterized in that said memory means stores said at least one additional signal of each of said first signal blocks of said (x) number of successive lines occurring in said one or more second signal blocks in the non-relevant lines in the modified video signal read from the track, and the second input of said second switching means is coupled to the output of said first switching means.

22. An apparatus as claimed in claim 20, wherein during the recording of said video signal, the write heads changed over a non-zero integer number (m) of times in each field and the at least one additional signal in each of the first signal blocks associated with (m) number of lines occurring, respectively, during the (m) number of change-overs of the write heads are stored and are then inserted in one or more specific second signal blocks associated with one or more non-relevant lines in the video signal, thereby forming the modified video signal, wherein said first switching means changes over said read heads from reading with one of said plurality of read heads to another of said plurality of read heads a non-zero integer number (m) of times each field, and wherein during reading, (m) number of additional signals are removed from the one or more subsequent second signal blocks in the non-relevant lines in the modified video signal read from the track, and are thereafter re-inserted into the associated (m) number of subsequent first signal blocks, characterized in that said memory means stores at least one additional signal of each of the first signal blocks in said (m) number of lines occurring in the one or more subsequent second signal blocks in the non-relevant lines of the modified video signal read from the track, and said apparatus further comprises:
- delay means, having an input and (m) number of output tappings, for delaying said at least one additional signal of each of the first signal blocks in said (m) number of lines occurring in the (m) number of subsequent first signal blocks, the output of the first switching means being coupled to both the second input of the second switching means and the input of the delay means;
- third switching means having a first and a second input, an output, and a control signal input, the output of said memory means being coupled to the first input of the third switching means and the output of the third switching means being coupled to the first input of the second switching means; and
- fourth switching means having (m) number of inputs, an output, and a control signal input, the (m) output tappings of said delay means being coupled, respectively, to the (m) number of inputs of said fourth switching means, and the output of said fourth switching means being coupled to the second input of said third switching means, said third and fourth switching means coupling, respectively, one of the inputs to the output under the influence of a fourth and fifth control signal applied, respectively, to the control inputs of the third and fourth switching means, respectively, said control means generating said fourth and fifth control signals.

23. An apparatus as claimed in claim 21 or 22, characterized in that said apparatus further comprises further delay means arranged before the second input of the second switching means.

24. A method of reproducing a video signal from tracks which are inclined relative to the longitudinal direction of a magnetic record carrier in the form of a tape by means of a plurality of read heads mounted on a rotatable head drum, in which said read heads are cyclically changed over from one to another during the reading of the video signal, the video signal comprising a sequence of lines each having a first signal block containing a line synchronizing signal and a second block containing chrominance and luminance information of the video signal, the first signal blocks each containing at least one additional signal in addition to the line synchronizing signal, wherein during recording, for preserving at least the additional signal that would otherwise be lost during the time when write heads are cyclically changed over from one to another, the at least one additional signal occurring in a specific first signal block of the video signal have been stored and are inserted in one or more specific second signal blocks associated with one or more non-relevant lines in the video signal, thereby forming a modified video signal, said non-relevant lines corresponding to lines in the video signal which occur outside of the display interval of a television picture signal, and then said modified video signal is recorded on said magnetic record carrier, wherein said specific second signal blocks containing said at least one additional signal are recorded in a track on the record carrier, characterized in that said method of reproducing a video signal comprises the steps:
  removing said at least one additional signal occurring in said specific second signal blocks in said modified video signal corresponding to said non-relevant lines in said video signal;
  storing in a memory said removed at least one additional signal; and
  re-inserting said stored at least one additional signal into the specific first signal block, thereby reconstituting said video signal.

25. A method of reproducing a video signal as claimed in claim 24, characterized in that said method of reproducing a video signal further comprises:
  delaying at least the first signal block of each line in the modified video signal read from the tracks by a time interval T, followed by said step of re-inserting said stored at least one additional signal into the specific first signal block.

26. A method of reproducing a video signal as claimed in claim 25, wherein during the recording of said video signal, the write heads changed over a non-zero integer number (m) of times in each field and the at least one additional signal in each of the first signal blocks associated with (m) number of lines occurring, respectively, during the (m) number of change-overs of the write heads are stored and are then inserted in one or more specific second signal blocks associated with one or more non-relevant lines in the video signal, thereby forming the modified video signal, characterized in that said method of reproducing a video signal comprises:
  changing over from reading with one of said plurality of read heads to another of said plurality of read heads (m) number of times during each field in the reading of said modified video signal;
  removing the (m) number of at least one additional signals from the specific second signal blocks in the modified video signal read from the track;
  storing in said memory said removed (m) number of at least one additional signals;
  delaying at least the first signal block of each line in the modified video signal read from the track; and
  re-inserting the stored (m) number of at least one additional signals into the relevant delayed (m) number of first signal blocks.

27. A method of reproducing a video signal as claimed in claim 26, characterized in that in said delaying step, at least said first signal of each line is delayed by at least a time interval T equal to $t_r$, where $t_r$ is a field period.

28. A method of reproducing a video signal as claimed in claim 24, wherein during the recording of said video signal, the write heads changed over only once in each field and the at least one additional signal in each of the first signal blocks associated with a non-zero integer number (x) of successive lines occurring during the change-over of the write heads are stored and are then inserted in one or more specific second signal blocks associated with one or more non-relevant lines in the video signal, thereby forming the modified video signal, characterized in that said method of reproducing a video signal comprises:
  changing over from reading with one of said plurality of read heads to another of said plurality of read heads only once during each field in the reading of said modified video signal;
  removing the (x) number of at least one additional signals from the specific second signal blocks in the modified video signal read from the tracks;
  storing said removed (x) number of at least one additional signals;
  delaying at least the first signal blocks of each line in the modified video signal read from the track; and
  re-inserting said (x) number of at least one additional signals into the relevant first signal blocks.

29. A method of reproducing a video signal as claimed in claim 28, characterized in that in said delaying step, at least said first signal block of each line is delayed by at least a time interval T equal to $(x+1)t_1$, where $t_1$ is a line period.

30. A method of reproducing a video signal as claimed in claim 24, wherein during the recording of said video signal, the write heads changed over only once in each field and the at least one additional signal in each of the first signal blocks associated with a non-zero integer number (x) of successive lines occurring during the change-over of the write heads are stored and are then inserted in one or more specific second signal blocks associated with one or more non-relevant lines in the video signal, thereby forming the modified video signal, characterized in that said method of reproducing a video signal comprises:
  changing over from reading with one of said plurality of read heads to another of said plurality of read heads only once during each field field in the reading of said modified video signal;

removing the at least one additional signal of each of the first signal blocks of said (x) number of successive lines from the one or more specific second signal blocks in the modified video signal read from the track during the non-relevant video lines;

storing in said memory said removed at least one additional signal of each of the first signal blocks of said (x) number of successive lines; and re-inserting said stored removed at least one additional signal of each of the first signal blocks of said (x) number of successive lines into the relevant (x) number of subsequent first signal blocks of the modified video signal.

31. A method of reproducing a video signal as claimed in claim 24, wherein during the recording of said video signal, the write heads changed over a non-zero integer number (m) of times in each field and the at least one additional signal in each of the first signal blocks associated with m number of lines occurring, respectively, during the (m) number of change-overs of the write heads are stored and are then inserted in one or more specific second signal blocks associated with one or more non-relevant lines in the video signal, thereby forming the modified video signal, characterized in that the method of reproducing a video signal comprises:

changing over from reading with one of said plurality of read heads to another of said plurality of read heads m number of times during each field in the reading of said modified video signal;

removing the at least one additional signal of each of the first signal blocks of said (m) number of lines from the one or more specific second signal blocks in the modified video signal read from the track during said non-relevant video lines;

storing in said memory said removed at least one additional signal of each of the first signal blocks of said (m) number of lines; and re-inserting said stored at least one additional signal of each of the first signal blocks of said (m) number of lines into the (m) number of subsequent first signal blocks in said modified video signal.

* * * * *